(12) United States Patent
Penner et al.

(10) Patent No.: US 11,790,429 B2
(45) Date of Patent: Oct. 17, 2023

(54) SYSTEMS AND METHODS FOR INTERPRETING COLORS AND BACKGROUNDS OF MAPS

(71) Applicant: Color Butler, Inc., Chula Vista, CA (US)

(72) Inventors: Robert Penner, Chula Vista, CA (US); David Fogel, La Jolla, CA (US); Gary Fogel, San Diego, CA (US); Yuval Shenkal, San Diego, CA (US); James Vaccaro, San Diego, CA (US); Christine Woodward, Chula Vista, CA (US)

(73) Assignee: Color Butler, Inc., Chula Vista, CA (US)

( * ) Notice: Subject to any disclaimer, the term of this patent is extended or adjusted under 35 U.S.C. 154(b) by 36 days.

(21) Appl. No.: 17/957,435

(22) Filed: Sep. 30, 2022

(65) Prior Publication Data

US 2023/0102598 A1 Mar. 30, 2023

Related U.S. Application Data

(60) Continuation-in-part of application No. 17/829,018, filed on May 31, 2022, now Pat. No. 11,544,768, which is a continuation-in-part of application No. 17/736,935, filed on May 4, 2022, now Pat. No. 11,526,925, which is a continuation-in-part of application No. 17/559,548, filed on Dec. 22, 2021, now Pat. No. 11,430,043, which is a continuation-in-part of application No. 17/499,106, filed on Oct. 12, 2021, now Pat. No. 11,328,339, which is a continuation-in-part of application No. 17/174,031, filed on Feb. 11, 2021, now Pat. No. 11,157,988, which is a continuation-in-part of application No. 16/842,247, filed on Apr. 7, 2020, now Pat. No. 10,963,944, which is a division of application No. 15/826,245, filed on Nov. 29, 2017, now Pat. No. 10,614,506.

(60) Provisional application No. 62/451,592, filed on Jan. 27, 2017.

(51) Int. Cl.
G06Q 30/00 (2023.01)
G06Q 30/06 (2023.01)
G06N 20/00 (2019.01)
G06Q 30/0601 (2023.01)

(52) U.S. Cl.
CPC ........... *G06Q 30/0631* (2013.01); *G06N 20/00* (2019.01); *G06Q 30/0643* (2013.01)

(58) Field of Classification Search
CPC ..................................................... G06N 20/00
USPC .................................................... 705/26, 27
See application file for complete search history.

(56) References Cited

U.S. PATENT DOCUMENTS 6,424,370 B1 7/2002 Courtney
7,617,016 B2 11/2009 Wannier et al.
(Continued)

OTHER PUBLICATIONS

"Designing Augmented Reality Systems to Empower People with Low Vision."Zhao, Yuhang. Cornell University. ProQuest Dissertations Publishing, 2020. 28026772. (Year: 2020).*
(Continued)

*Primary Examiner* — Robert M Pond
(74) *Attorney, Agent, or Firm* — Lewis Kohn & Walker LLP; David M. Kohn

(57) ABSTRACT

Novel system, methods, which include machine learning, and device for providing color, mapping and fashion recommendations, including for persons with visual impairment
(Continued)

such as color blindness or complete blindness. Also described are methods for assisting an individual with the task of interpreting at least one map, the method comprising: providing a portable communication device to identify and extract color and/or pattern from the at least one map through use of a camera and at least one algorithm; providing a processor capable of accessing locally stored and/or remote information about the at least one map; assigning colors on the at least one map with a red green blue (RGB) value through use of a color assignment algorithm; wherein the individual can touch a spot on digital renditions of the at least one map to determine the RGB value; providing a database for storing the digital renditions of the at least one map; wherein the individual imports the at least one map, through a series of photos or videos, for bulk imports into the database; providing revisions to the at least one map or designs for at least one novel map, for use in real-world or virtual environments, wherein the at least one map can be scored relative to a backround in the virtual environment such that map colors or map backrounds or both the map colors and the map backrounds are adjusted resulting in alternate color combinations in virtual contexts.

20 Claims, 15 Drawing Sheets

(56) References Cited

U.S. PATENT DOCUMENTS

| | | | | |
|---|---|---|---|---|
| 8,103,551 | B2* | 1/2012 | Saul et al. | G06N 3/02 |
| | | | | 705/26.7 |
| 8,249,941 | B2 | 8/2012 | Saul et al. | |
| 8,682,738 | B2 | 3/2014 | Ivanov | |
| 9,070,171 | B2 | 6/2015 | Guo et al. | |
| 10,614,506 | B2 | 4/2020 | Penner et al. | |
| 10,963,944 | B2 | 3/2021 | Penner et al. | |
| 11,157,988 | B2 | 10/2021 | Penner et al. | |
| 11,389,339 | B2 | 5/2022 | Schiffer | |
| 2005/0075145 | A1 | 4/2005 | Dvorak et al. | |
| 2008/0126962 | A1 | 5/2008 | Cook | |
| 2008/0294528 | A1 | 11/2008 | Denk, Jr. et al. | |
| 2010/0191770 | A1 | 7/2010 | Cho et al. | |
| 2011/0082764 | A1 | 4/2011 | Flusser et al. | |
| 2012/0171989 | A1* | 7/2012 | Matsuo et al. | H04L 51/224 |
| | | | | 455/404.2 |
| 2015/0116227 | A1* | 4/2015 | Lin et al. | H04N 5/217 |
| | | | | 345/173 |
| 2015/0123982 | A1* | 5/2015 | Schoening | G06T 11/001 |
| | | | | 345/589 |
| 2015/0186965 | A1 | 7/2015 | Paul | |
| 2016/0026253 | A1* | 1/2016 | Bradski et al. | H04N 13/128 |
| | | | | 345/8 |
| 2016/0026926 | A1 | 1/2016 | Yeung et al. | |
| 2016/0161259 | A1* | 6/2016 | Harrison et al. | G01S 19/51 |
| | | | | 701/409 |
| 2017/0011452 | A1 | 1/2017 | Beckham | |
| 2017/0076011 | A1 | 3/2017 | Gannon | |
| 2017/0277365 | A1 | 9/2017 | Gaidar et al. | |
| 2017/0365011 | A1 | 12/2017 | McIlroy et al. | |
| 2019/0246895 | A1* | 8/2019 | Kodimer | G06T 5/009 |
| 2021/0004589 | A1 | 1/2021 | Turkelson et al. | |
| 2021/0133160 | A1 | 5/2021 | Craft | |

OTHER PUBLICATIONS

NewsRX: "Computerized Device, System, and Method for Coordinating an Outfit" in Patent Application Approval Process Marketing Weekly News [Atlanta] Jul. 25, 2015: 178. Dialog #1696695159; 8pgs. (Year: 2015).

* cited by examiner

SYSTEMS AND METHODS FOR INTERPRETING COLORS AND BACKGROUNDS OF MAPS

RELATED APPLICATIONS

This application is a continuation-in-part based on U.S. Pat. Application No. 17/829,018 filed May 31, 2022, which is a continuation-in-part application based on U.S. Pat. Application No. 17/736,935 filed May 4, 2022, which is a continuation-in-part application based on U.S. Pat. Application No. 17/559,548 filed Dec. 22, 2021, which is a continuation-in-part application based on U.S. Pat. Application No. 17/499,106 filed Oct. 12, 2021, which is a continuation-in-part based on U.S. Pat. Application No. 17/174,031 filed Feb. 21, 2021, which is a continuation-in-part application of U.S. Pat. Application No. 16/842,247 filed Apr. 7, 2020, now U.S. Pat. No. 10,963,944, which is a divisional application of U.S. Pat. Application No. 15/826,245 filed Nov. 29, 2017, now U.S. Pat. No. 10,614,506, which claims the benefit of priority from U.S. Provisional Pat. Application No. 62/451,592 filed Jan. 27, 2017, the entire contents of which are herein incorporated by reference.

FIELD OF THE INVENTION

The present invention provides a novel system, methods, which include machine learning, and device for providing color and fashion recommendations, including for persons with visual impairment such as color blindness or complete blindness. Many online or application-based fashion systems provide personal image content that allow users to select and evaluate combinations of clothes by eye. Some of these systems include outside human expert guidance as to what is or is not fashionable. A present challenge is to assist color blind or blind people, or people with little to no fashion sense, with a system, methods, and device that provides the ability to evaluate clothing options from their closet, other people's closets, retailers, or elsewhere, record and plan clothing sets for future engagements, and receive audio, video, or other means of feedback about the appropriateness of those selections. The present invention addresses these challenges to help evaluate and recommend color and fashion solutions.

BACKGROUND OF THE INVENTION

For both men and women, fashion styles, as well as the clothing items includes in such styles, may be very difficult to distinguish and discern. It can be even more so for certain individuals having specific eye conditions, such as color blindness.

It is known in the relevant art that attempts to solve such a problem related to selection based on fashion choices exist. For example, U.S. Pat. No. 8,249,941 describes methods for selecting fashion items, pairing with additional fashion items, as associated with a style matrix. However, this is a system based on a static fashion style matrix with set attributes, as opposed to accessing any other type of variable (such as opinions of fashion experts, etc.). Further, there is no association with actual clothing items within a user's wardrobe.

U.S. Pat. No. 8,103,551 discloses methods using a mathematical function to ascertain any similarities between article attributes and compares to a threshold in order to determine if such attributes are sufficiently similar. While such methods are helpful in comparing articles of clothing in order to recognize associations across different types of articles, there is no ability to incorporate other variables into methodology to include more practical items, such as digital versions of an actual user's clothes in their closet, or inclusion of expert recommendations for subsequent matching of clothing or real-time access to purchase such outfits.

Thus, there still exists a need in the art to help evaluate and recommend color and fashion solutions on a device suitable for a user in need thereof.

SUMMARY OF THE INVENTION

This invention provides a system, methods, and device for optimizing color and fashion decisions for visually impaired and other people. The invention allows the human user to more competently choose clothing sets in relation to season, weather, or other environment. The system, methods, and device also provides the opportunity to learn about useful recommendations from the data collected through a social network of other human users, coupled with knowledge about apparel manufacturers and their available garments and costs.

In one aspect, the present invention provides a system of selecting a preferred matching set of garments to assemble an outfit, comprising: a device further comprising a data storage system for storing the set of garments, wherein the set of garments further comprises colors and/or patterns as inputted into the device by a user, wherein the set of garments is scored by the device.

In another aspect, the present invention describes a method of selecting a preferred matching set of garments to assemble an outfit for an individual, the method comprising: providing a data storage system for storing digital renditions of garments or accessories, providing a processor capable of accessing locally stored and/or remote information about or learning the preferred matching set of garments.

In yet another aspect, the present invention describes a method for assisting an individual with the task of interpreting at least one map, the method comprising: providing a portable communication device to identify and extract color and/or pattern from the at least one map through use of a camera and at least one algorithm; providing a processor capable of accessing locally stored and/or remote information about the at least one map; assigning colors on the at least one map with a red green blue (RGB) value through use of a color assignment algorithm; wherein the individual can touch a spot on digital renditions of the at least one map to determine the RGB value; providing a database for storing the digital renditions of the at least one map; wherein the individual imports the at least one map, through a series of photos or video, for bulk import into the database; providing revisions to the at least one map or designs for at least one novel map, for use in real-world or virtual environments. Optionally, the at least one map or designs for the at least one novel map in real-world contexts have two or more dimensions and one or more colors. Alternatively, the at least one map or designs for the at least one novel map in virtual environments have two or more dimensions, one or more colors and change dramatically. Preferably, the at least one map or designs for the at least one novel map in the virtual environments are immersive in three or more dimensions and allow the individual to become a virtual character to exist within the at least one map or designs for the at least one novel map. Most preferably, the at least one algorithm is a case-based procedure. Alternatively, the at least one map is inputted to the processor using the bulk import via photography or video.

In yet another aspect, color combinations within the at least one map are evaluated for their quality relative to the at least one map itself and relative to any background color which may exist. Furthermore, machine learning techniques are used as the color assignment algorithm to automatically identify colors and their locations associated with the at least one map. Optionally, the machine learning techniques include any combination of neural networks or deep learning, evolutionary algorithms, reinforcement learning, support vector machines, random forest methods, swarm optimization and fuzzy logic. Preferably, a database of map and user information is generated including information about users, backgrounds, color filters, maps and their combination. Alternatively, the at least on map is placed on a virtual character in the virtual environment as a skin. Optionally, the at least one map can be scored relative to a background in the virtual environment such that map colors or map backgrounds or both the map colors and the map backgrounds are adjusted resulting in alternate color combinations in virtual contexts. Preferably, a software application using statistical methods and/or machine learning evaluates combinations of the map colors and the map backgrounds based on their associated colors and makes adjustments in order to maximize performance in the virtual contexts, wherein the machine learning comprises a combination of neural networks or deep learning, evolutionary algorithms, reinforcement learning, support vector machines, random forest methods, swarm optimization and fuzzy logic. More preferably, iterative variation, scoring, and selection results in new maps and new backgrounds in the virtual contexts. Alternatively, combinations of the map colors and the map backgrounds are exported as non-fungible tokens, and/or stored in the database for storing the digital renditions of the at least one map for the understanding of color matching and its relation to map making. Optionally, non-visual senses are used to enhance or change the perception of color in the virtual contexts. Alternatively, combinations of the map colors and the map backgrounds are preserved as filters for the individual in the real-world or virtual environments.

In an alternative embodiment, the RGB value is represented to the individual through audio feedback in a form of a tone or voice. In another aspect, color palettes used in the color assignment algorithm are pre-loaded based on a known visual impairment of the individual. Alternatively, color palettes used in the color assignment algorithm are combined with standard color palettes to generate novel colors in the at least one map. Optionally, the database of map and user information is used to identify color palettes that either maximize or minimize the visual impairment of the individual. Preferably, human visual impairments can be identified automatically through the generation of color filters.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

REFERENCE NUMERALS IN DRAWINGS

Figure 1:
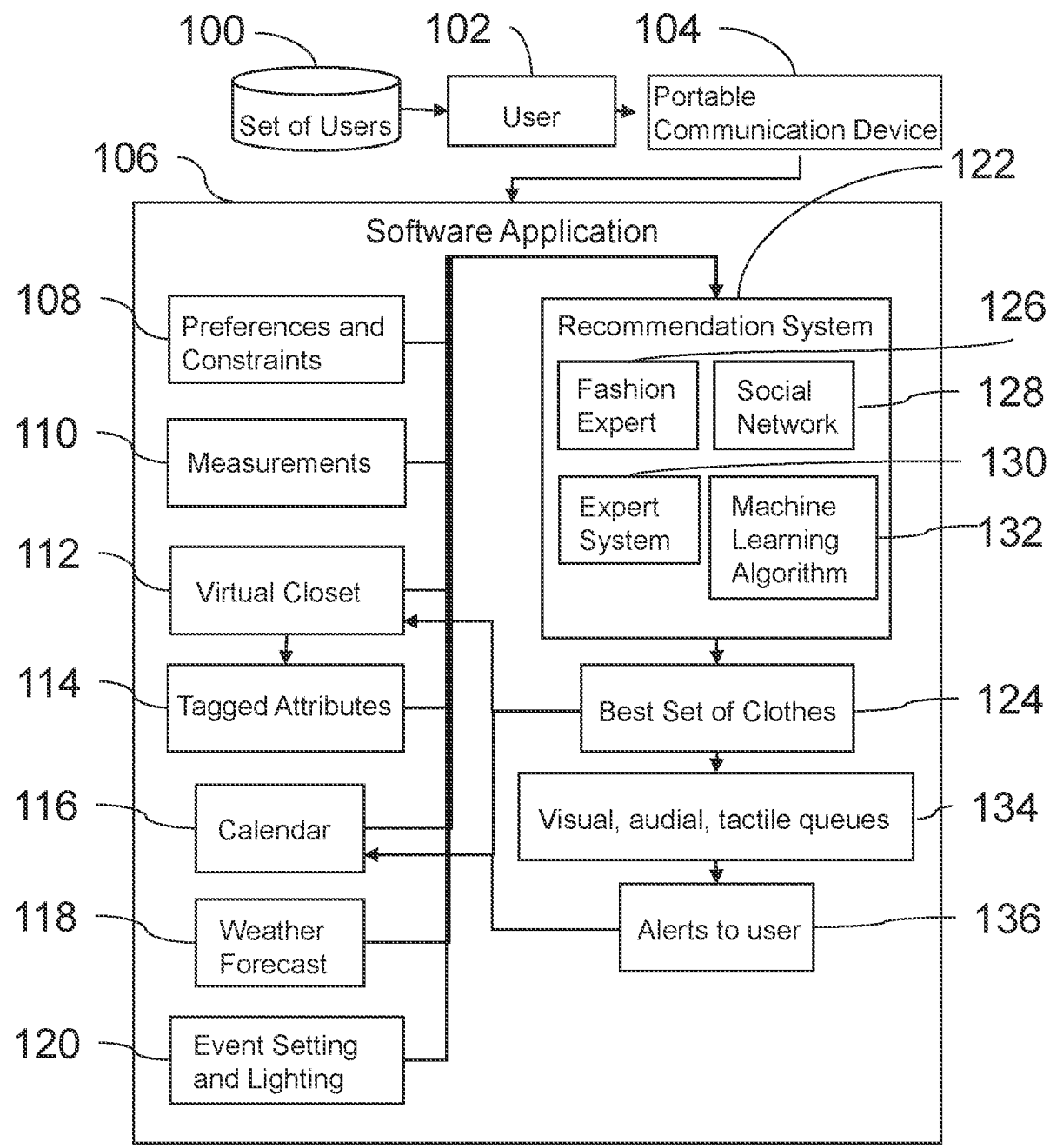
FIG. 1 depicts a block diagram of the system, methods, and device for providing fashions recommendations to users.
Figure 2:
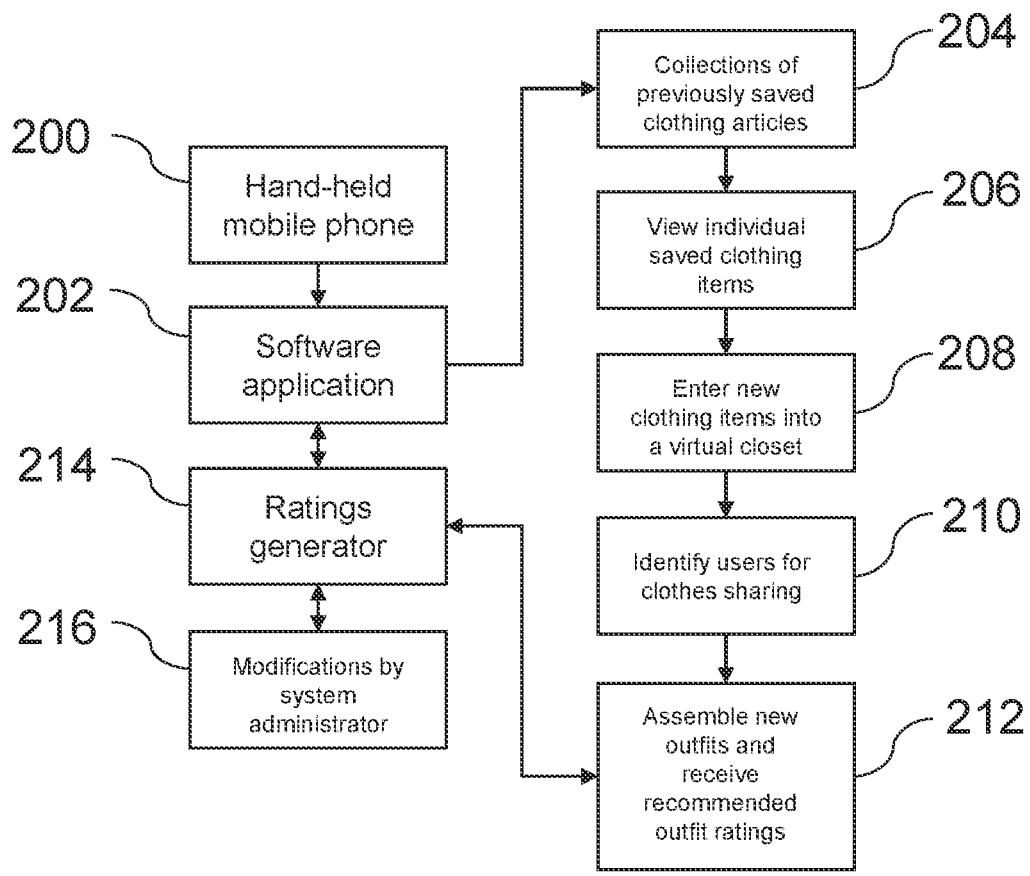
FIG. 2 depicts a block diagram of the system and methods for the input and use of clothing items within the device.
Figure 3:
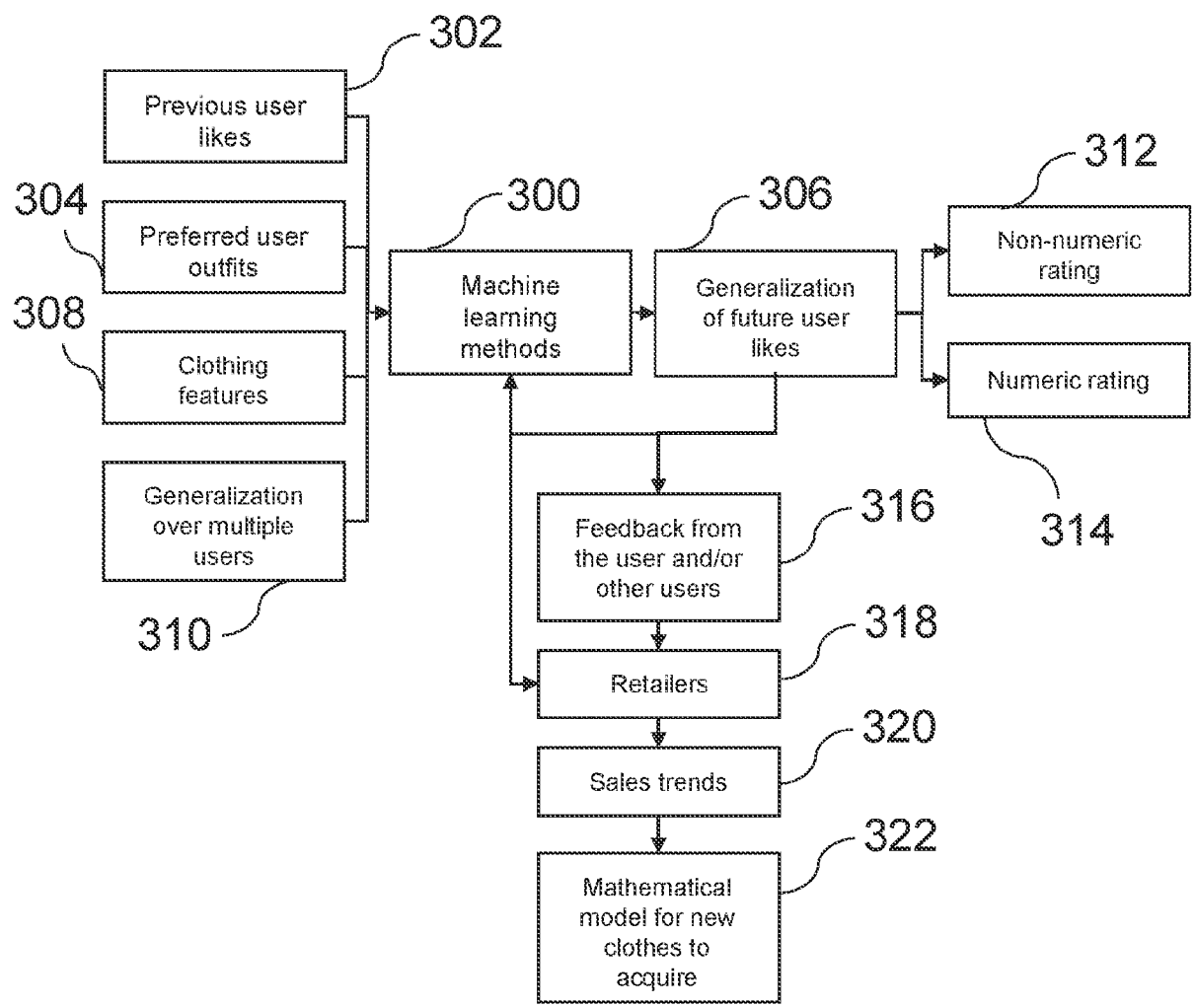
FIG. 3 depicts a block diagram of the system and methods for use of scoring and providing scores for clothing sets and providing information back to retailers within the device.
Figure 4:
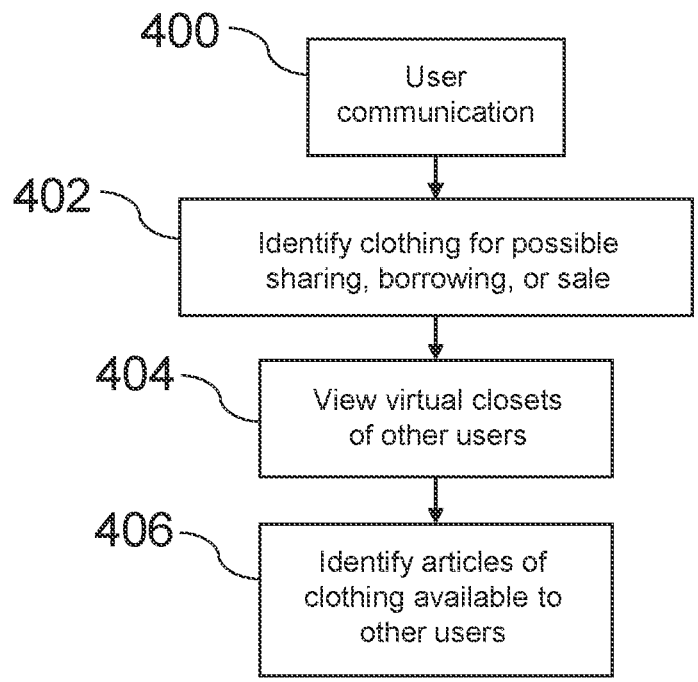
FIG. 4 depicts a block diagram of the system and methods allowing for user-to-user communication and sharing of closets and clothes through the device.
Figure 5:
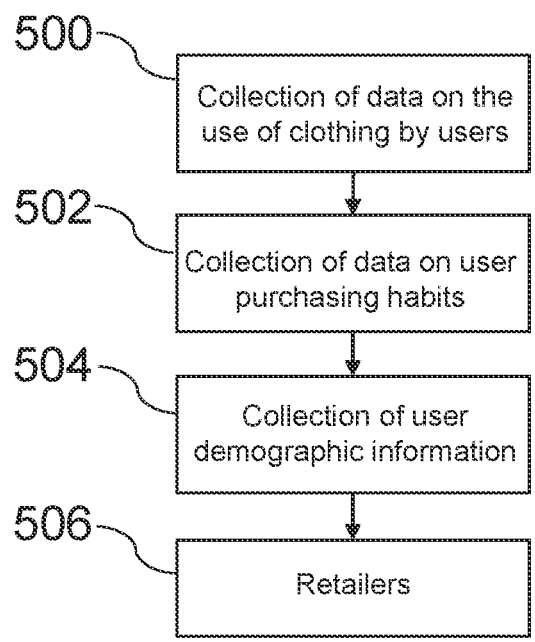
FIG. 5 depicts a block diagram of the system and methods for the collection of data by type and their utility to retailers within the device.
Figure 6:
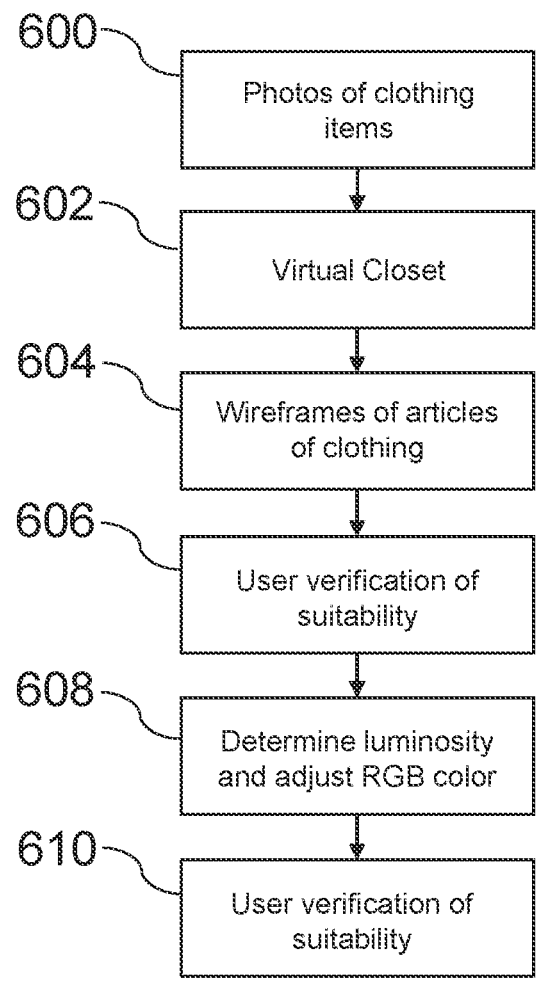
FIG. 6 depicts a block diagram of the system and methods of populating virtual closets using various means with the device.
Figure 7:
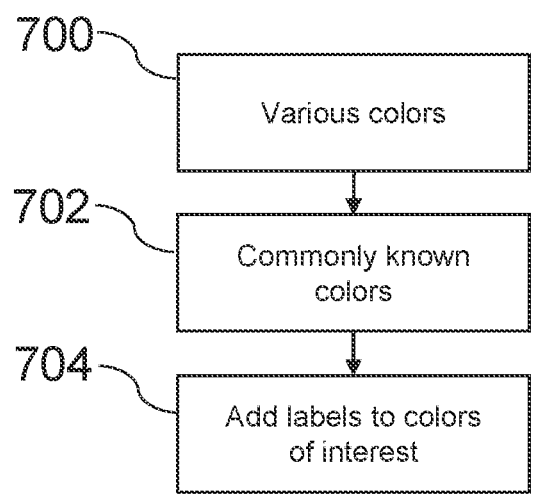
FIG. 7 depicts a block diagram of the system and methods allowing the assignment of proper labels to colors in the device.
Figure 8:
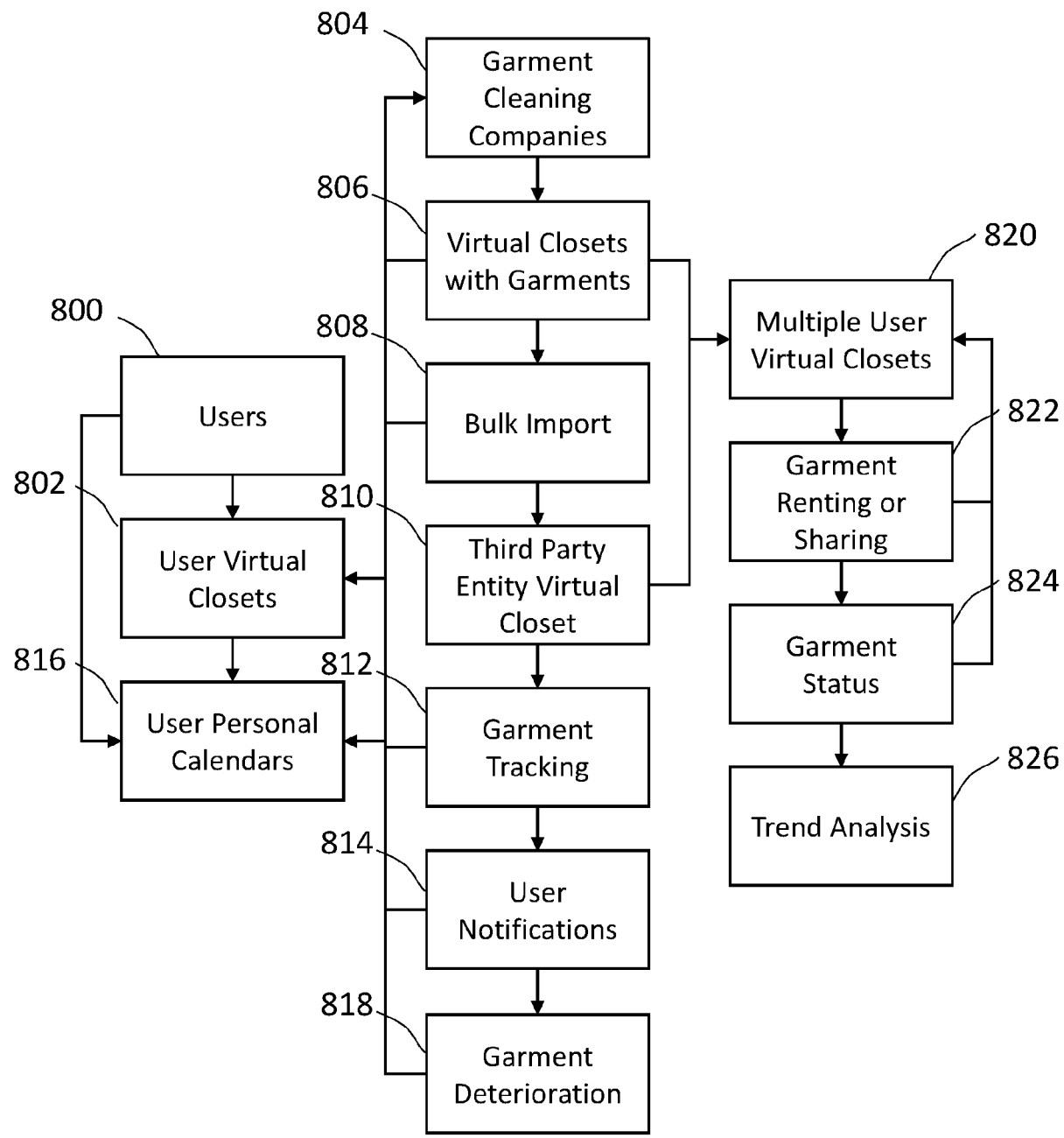
FIG. 8 depicts a block diagram of the system and methods for use by third party entities, including garment cleaning companies.
Figure 9:
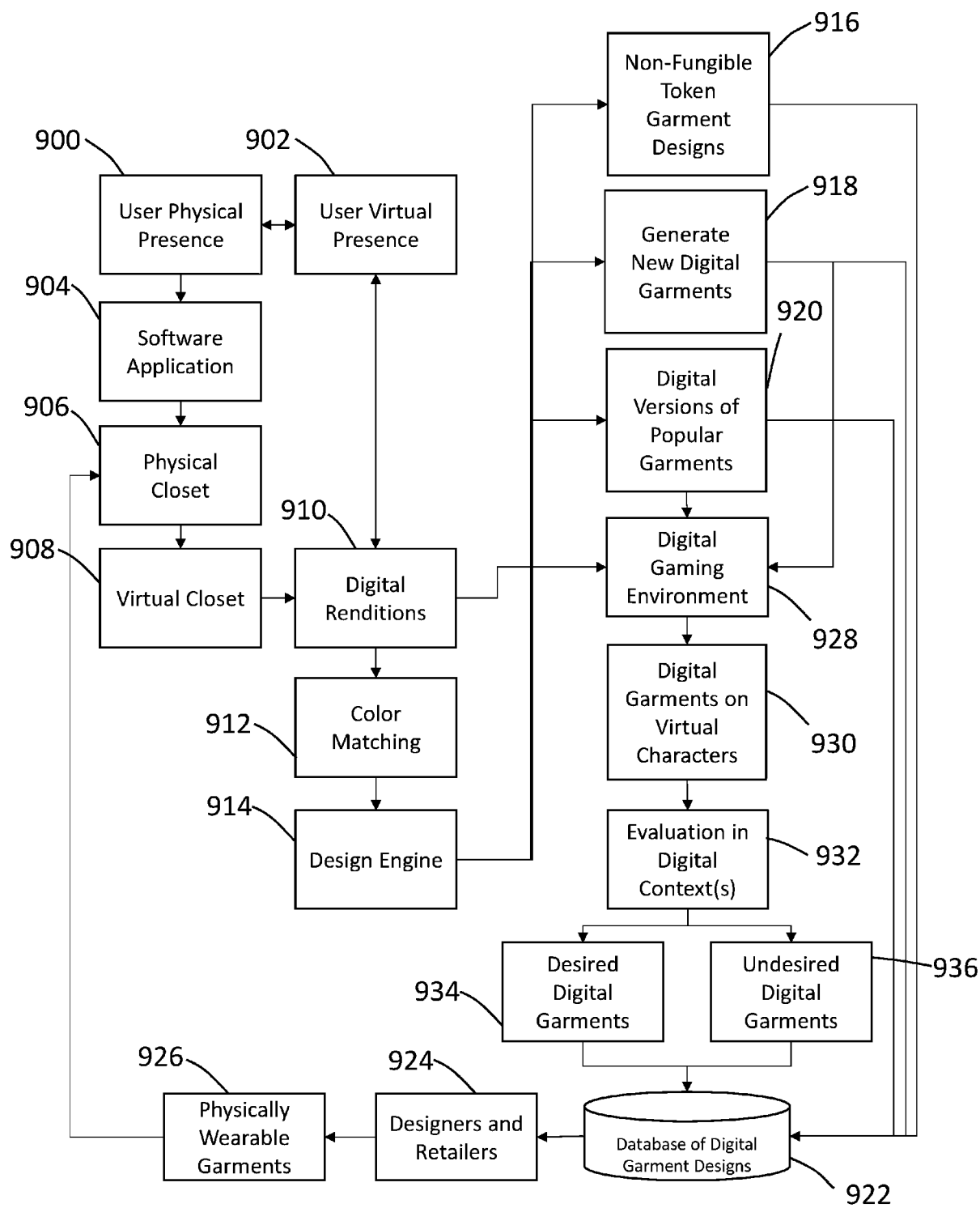
FIG. 9 depicts a block diagram of the system and methods allowing the use of virtual closets for garments in virtual settings.
Figure 10:
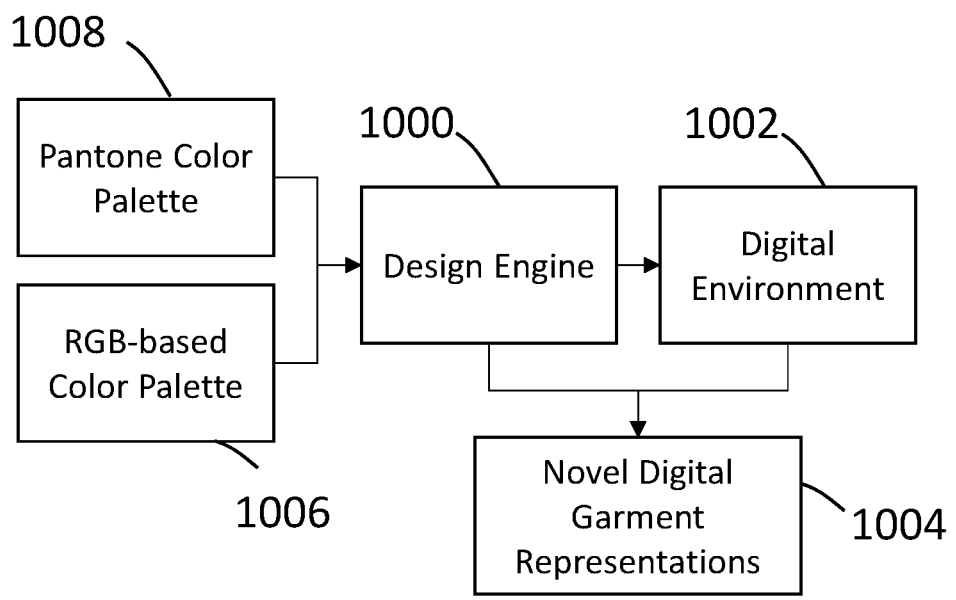
FIG. 10 depicts a block diagram of the system and methods for the digital design of novel digital garment representations using a design engine.
Figure 11:
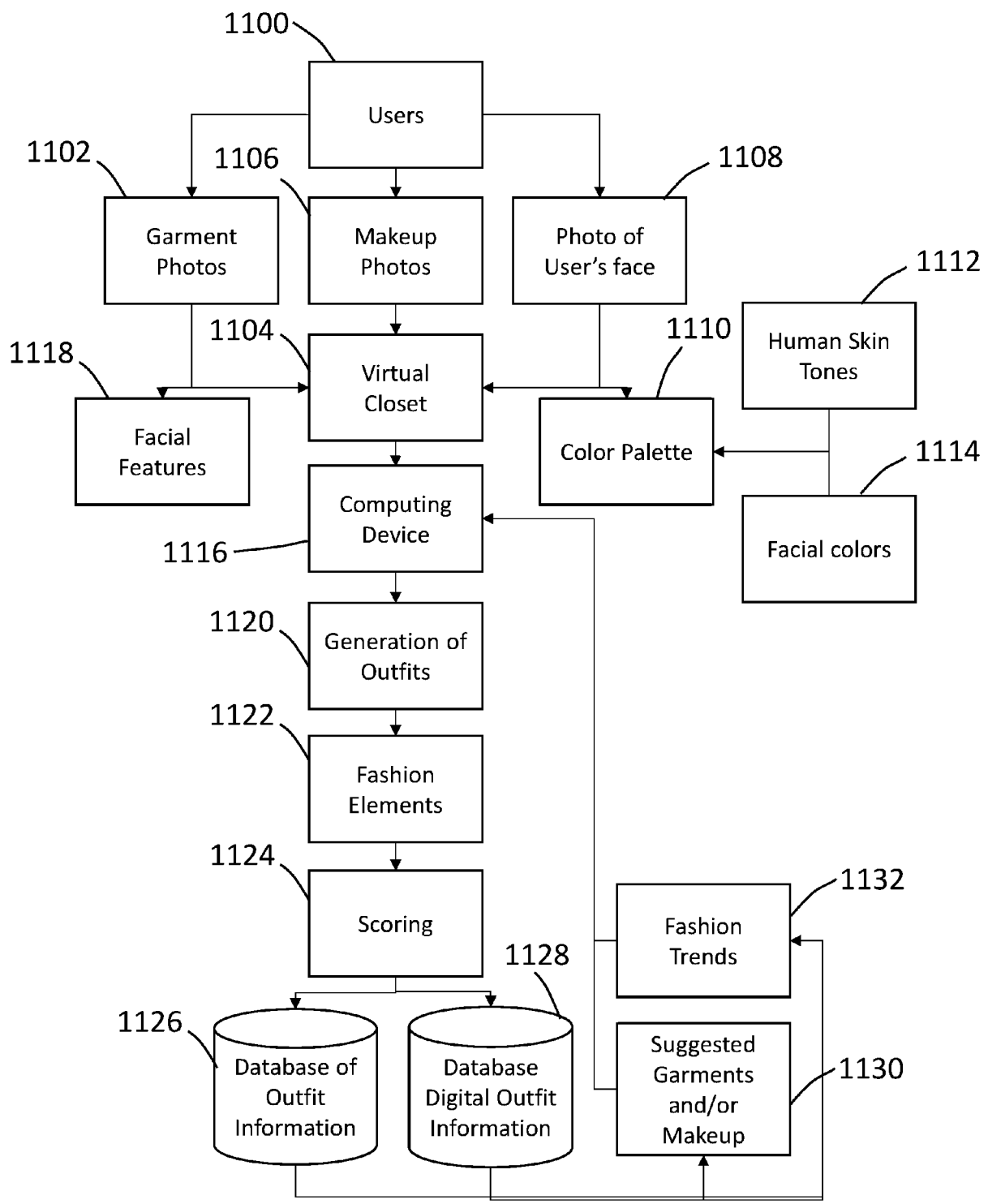
FIG. 11 depicts a block diagram of the system and methods allowing the inclusion of skin tone and makeup for the generation and scoring of outfits, as well as in the design of novel digital representations of the physical world.
Figure 12:
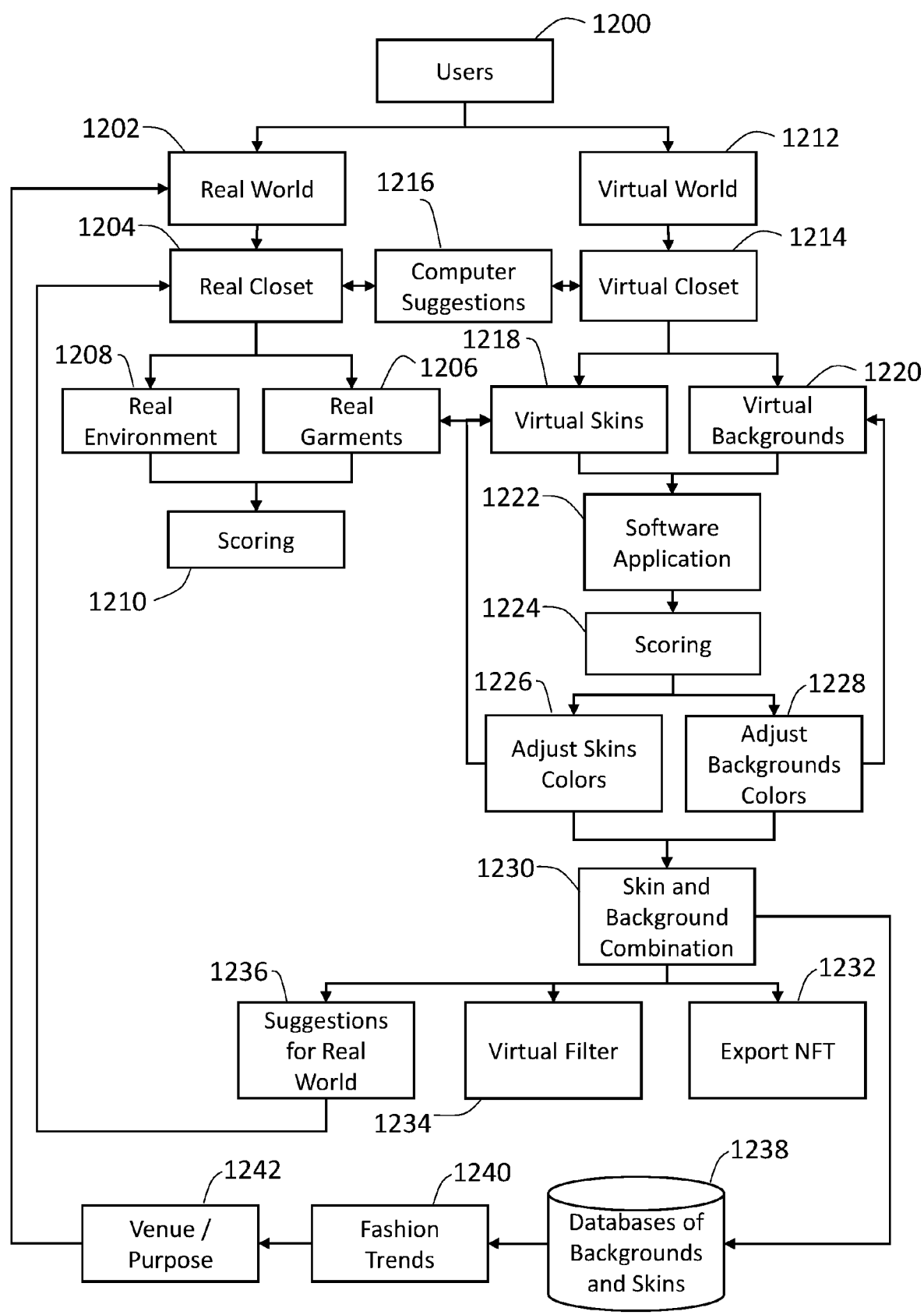
FIG. 12 depicts a block diagram of the system and methods for the scoring and adjustment of colors in virtual settings to assist in the generation and scoring of skins and backgrounds.
Figure 13:
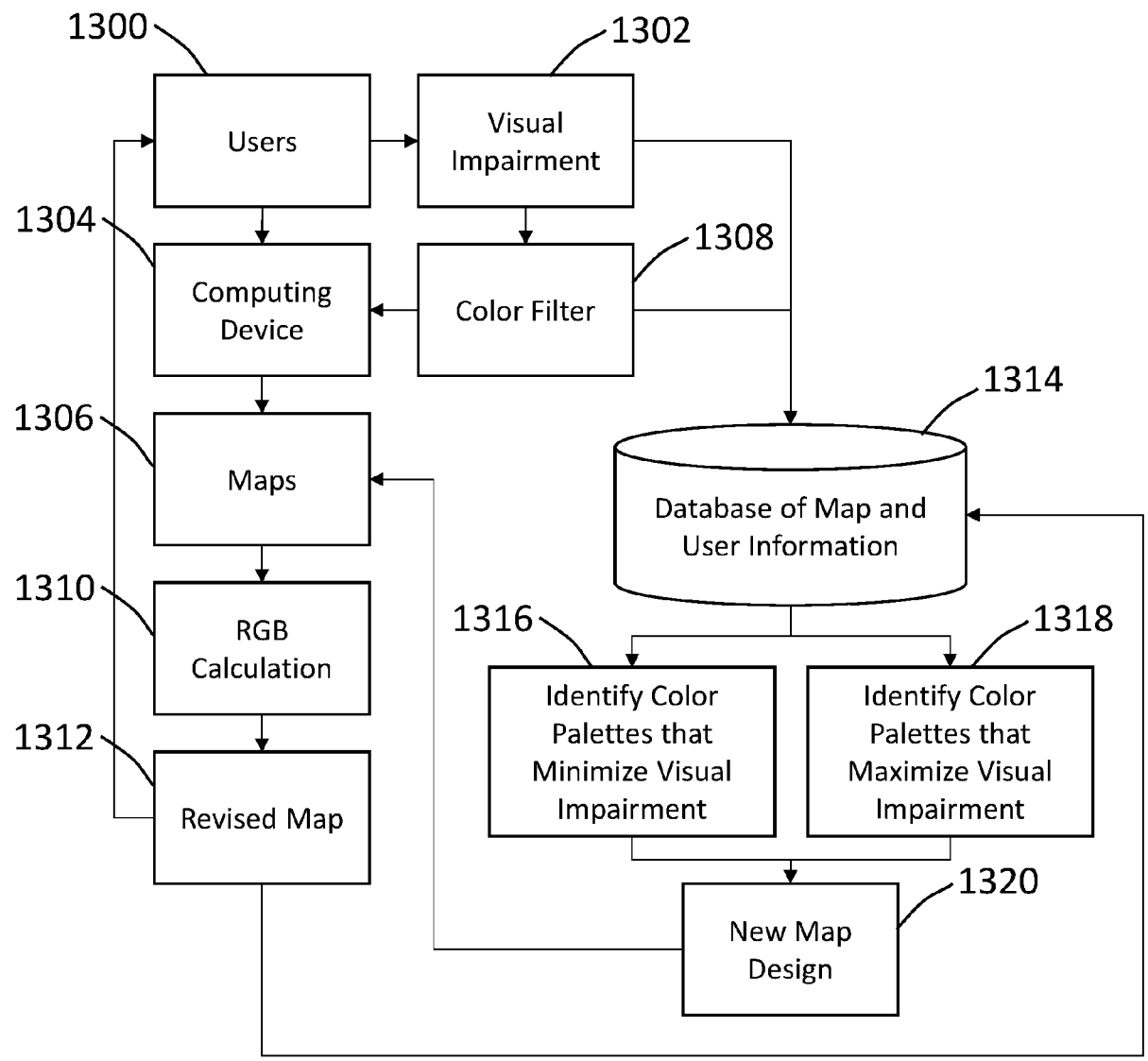
FIG. 13 depicts a block diagram of the system and methods for the design of color filters that result in revised maps to improve map design.
Figure 14:
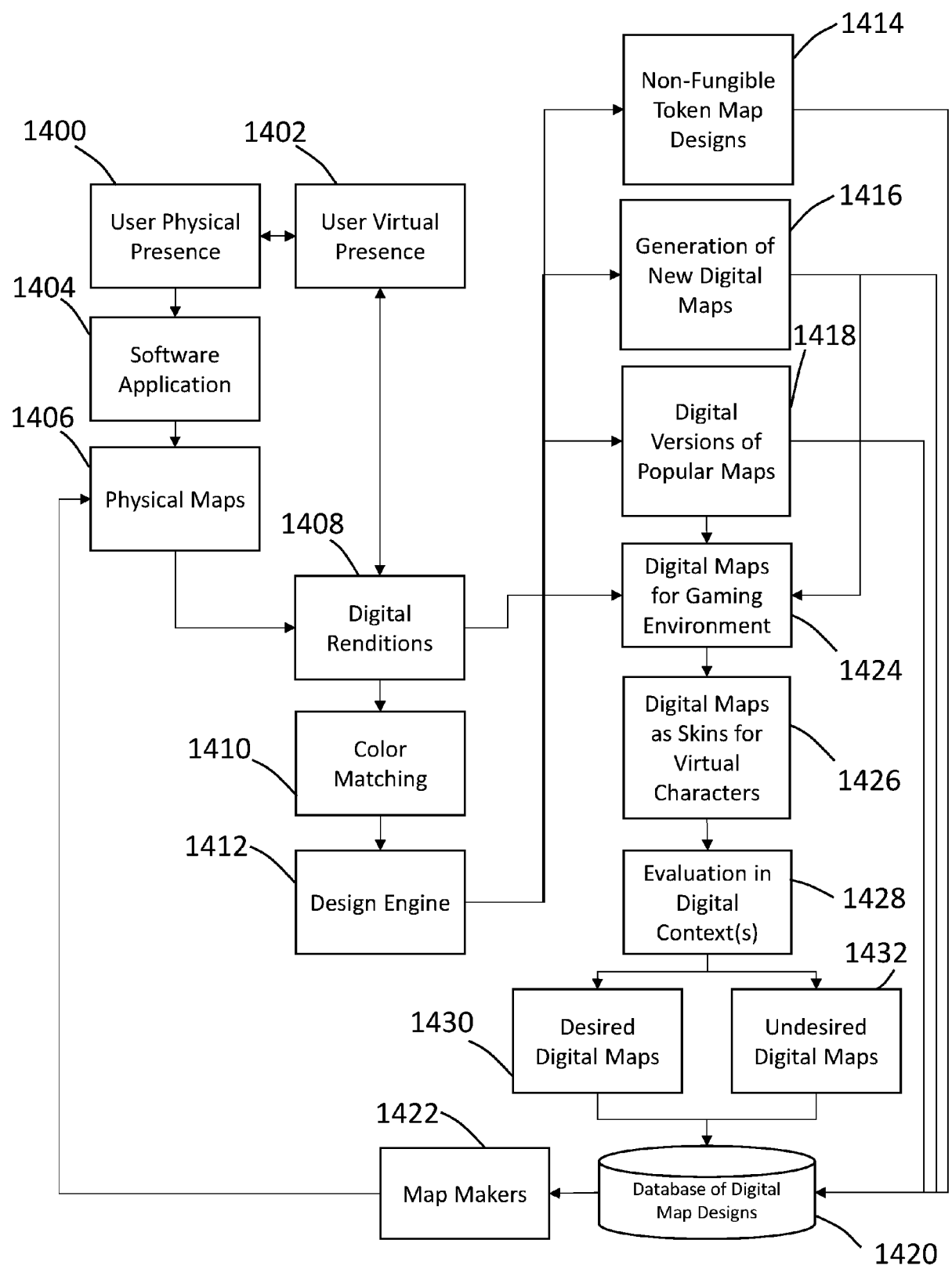
FIG. 14 depicts a block diagram of the system and methods for the development and scoring of map renditions in digital contexts towards the improved design of maps in both virtual and real contexts.
Figure 15:
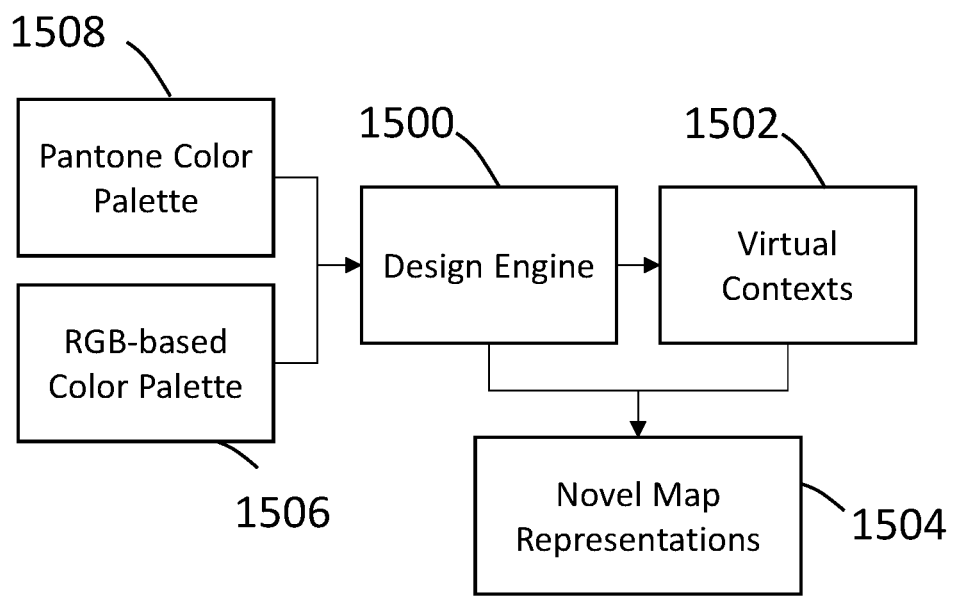
FIG. 15 depicts a block diagram of the system and methods that combine color palettes through a design engine towards the generation of novel map representations specific to environments.

Reference Numerals in FIG. 1:
100 Set of users
102 User
104 Portable communication device
106 Software application
108 Preferences and constraints
110 Measurements
112 Virtual closet
114 Tagged attributes
116 Calendar
118 Forecasted weather
120 Event setting and lighting
122 Recommendation system
124 Best set of clothes
126 Fashion expert
128 Social network
130 Expert system
132 Machine learning algorithm
134 Visual, audial, tactile queues
136 Alerts to user
Reference Numerals in FIG. 2:
200 Hand-held mobile phone 202 Software application
204 Collections of previously saved clothing articles
206 View individual saved clothing items
208 Enter new clothing items into a virtual closet
210 Identify users for clothes sharing
212 Assemble new outfits and receive recommended outfit ratings
214 Ratings generator
216 Modifications by system administrator
Reference Numerals in FIG. 3:
300 Machine learning methods
302 Previous user likes
304 Preferred user outfits
306 Generalization of future user likes
308 Clothing features
310 Generalization over multiple users
312 Numeric rating
314 Non-numeric rating
316 Feedback from the user and/or other users
318 Retailers
320 Sales trends
322 Mathematical model for new clothes to acquire
Reference Numerals in FIG. 4:
400 User communication
402 Identify clothing for possible sharing, borrowing, or sale
404 View virtual closets of other users
406 Identify articles of clothing available to other users
Reference Numerals in FIG. 5:
500 Collection of data on the use of clothing by users
502 Collection of data on user purchasing habits
504 Collection of user demographic information
506 Retailers
Reference Numerals in FIG. 6:
600 Photos of clothing items
602 Virtual closet
604 Wireframes of articles of clothing
606 User verification of suitability
608 Determine luminosity and adjust RGB color
610 Photo with current light setting as reference
Reference Numerals in FIG. 7:
700 Various colors
702 Commonly known colors
704 Add labels to colors of interest
Reference Numerals in FIG. 8:
800 Users
802 User virtual closet
804 Garment cleaning companies
806 Virtual closets with garments
808 Bulk import
810 Third party entity virtual closet
812 Garment tracking
814 User notifications
816 User personal calendar
818 Garment deterioration
820 Multiple user virtual closets
822 Garment renting or sharing
824 Garment status
826 Trend analysis
Reference Numerals in FIG. 9:
900 User physical presence
902 User virtual presence
904 Software application
906 Physical closet
908 Virtual closet
910 Digital renditions
912 Color matching
914 Design engine
916 Non-fungible token garment designs
918 Generate new digital garments
920 Digital versions of popular garments
922 Database of digital garment designs
924 Designers and retailers
926 Physically wearable garments
928 Digital gaming environment
930 Digital garments on virtual characters
932 Evaluation in digital context(s)
Reference Numerals in FIG. 10:
1000 Design engine
1002 Digital environment
1004 Novel digital garment representations
1006 RGB-based color palette
1008 Pantone color palette
Reference Numerals in FIG. 11:
1100 Users
1102 Garment photos
1104 Virtual closet
1106 Makeup
1108 Photo of user's face
1110 Color palette
1112 Human skin tones
1114 Other facial colors
1116 Computing device
1118 Automatic recognition of facial features and colors
1120 Generation of outfits
1122 Other fashion elements
1124 Generation and scoring of outfits
1126 Database of outfit information
1128 Database of digital outfit information
1130 New garment or makeup choices
1132 Machine learning for trend analysis
Reference Numerals in FIG. 12:
1200 Users/Individuals
1202 Real world
1204 Real closet
1206 Real garments
1208 Real environment
1210 Scoring
1212 Virtual world
1214 Virtual closet
1216 Computer Suggestions
1218 Virtual skins
1220 Virtual environments
1222 Software application
1224 Scoring
1226 Adjust skins colors
1228 Adjust backgrounds colors
1230 Best combination
1232 Export NFT
1234 Virtual filter
1236 Suggestions for real-world
1238 Databases of backgrounds and skins
1240 Fashion trends
1242 Venue / Purpose
Reference Numerals in FIG. 13:
1300 Users
1302 Visual impairment
1304 Computing device
1306 Maps
1308 Color filter
1310 RGB calculation
1312 Revised map
1314 Database of map and user information
1316 Identify color palettes that minimize visual impairment
1318 Identify palettes that maximize visual impairment
1320 New map design
Reference Numerals in FIG. 14:
1400 User physical presence
1402 User virtual presence 1404 Software application
1406 Physical maps
1408 Digital renditions
1410 Color matching
1412 Design engine
1414 Non-fungible token map designs
1416 Generation of new digital maps
1418 Digital versions of popular maps
1420 Database of digital map designs
1422 Map makers
1424 Digital maps for gaming environments
1426 Digital maps as skins for virtual characters
1428 Evaluation in digital context(s)
1430 Desired digital maps
1432 Undesired digital maps
Reference Numerals in FIG. 15:
1500 Design engine
1502 Virtual contexts
1504 Novel map representations
1506 RGB-based color palette
1508 Pantone color palette

DETAILED DESCRIPTION OF THE INVENTION

A preferred embodiment of the present invention is illustrated in FIG. 1.

As used herein, the terms "user" and "individual," whether singular or plural, are synonyms and refer to the same type of person interacting with the systems of the present invention.

A set of users 100 use the color and/or fashion recommendation system. A user 102 interacts with the recommendation system using a computing device 104, most typically a hand-held phone. Residing on the phone is a software application 106 that is the basis of the recommendation system. The user inputs color and/or fashion preferences and constraints 108, measurements 110, and generates a virtual closet of their garments, potentially including accessories 112, where each garment or accessory is associated with tagged attributes 114. A calendar 116 is used by the user to define current and future events, their type, and garment need relative to expected weather forecast 118, if known, and event setting and lighting 120. Within the device, a recommendation system 122 uses one or a set of approaches, to generate a suggested set of clothes 124 for each event on the user's calendar 116. These approaches include the advice of a human fashion expert 126, advice and/or choices of a social network of other users of the device and system 128, computer rule-based and/or case-based expert system 130, and/or machine learning algorithm 132. The suggested set of clothes is offered to the user using visual, audial, and/or tactile queues 134 where the user can approve or reject the recommendations. The user can iteratively use the system to find increasingly appropriate sets of clothes. The user-selected set of clothes is then automatically linked to the calendar, and the system provides alerts to the user 136 as to which sets to wear on which future dates and which garments might be required to be picked up from the cleaners so that they are available in advance of specific events. The overall flow of the recommendation system, methods, and device allows for the rapid, interactive, selection of appropriate garments and/or accessories with human assistance or using machine learning methods, and in a manner that can be compatible with colorblind or blind users as well those who are non-visually impaired.

A user 102 from a set of users 100 makes use of a computing device 104 such as a hand-held phone, tablet, personal computer, or personal data assistant to interface with the software application 106 of interest. The user establishes color and/or fashion preferences and constraints 108 that include, for example location, geocultural predisposition, personal measurements including body type, age, complexion, gender, hair color, style, season, retailer, alerts, and the ability to link to other users of the software application. The choice of gender in the preferences may cause changes to the manner in which information is presented in the software application to the end user. The user establishes measurements 110 for their size, shape, complexion, features and any other defining elements. These defining elements can also include qualitative or quantitative measures of the way in which clothing and accessories fit on the user given the user's shape and size may change with time. These features and constraints may be used by the system, methods, and device to help the user review and score clothing sets that are considered appropriate or best. For example, the system can help the user determine which clothes are best on an international trip where the chosen sets of clothes meet the appropriate color and/or fashion social conventions or forecasted weather at those foreign locations.

The user establishes the clothing and/or accessories they own as a virtual closet 112 within the software application. This can be accomplished by taking pictures of each item and importing them to the device, or in the preferred embodiment through the use of a process internal to the system and device that generates virtual clothing that is similar enough to the real clothing in color, quality, and shape so as to avoid the need to have to import photos of real items. Photos of clothes can also be imported to the system, method, and device from third-party retailers that already have photos of clothing. All clothing in the virtual closet is tagged 114 with attributes that can be used to identify the clothing in useful ways. For instance, the type of weather that is associated with the garment, the layer of the garment as for instance underwear or outerwear, or any requirements associated with events that are indoor or outdoor and associated lighting difference. Given this process is likely to be time-intensive for the end user, in the preferred embodiment the attributes of garments are inferred automatically through the history of their use and through the manner in which the user utilizes the garments over time. Under conditions of limited space, such as loading baggage for a trip, the dimensions of the baggage may provide an upper bound to the number of possible objects selected, and this too can be established if desired in the preferences and constraints 108 information. Each user can choose to share his/her virtual closet with other users or choose which garments or accessories are specifically to be shared or not and with which specified users. The more information that is shared between the users, the more information that can be used by the system, methods, and device towards automatically assigning proper attributes to garments. This information is stored within the system, methods, and device and/or in connection to a cloud-computing environment. A central problem that the system, methods, and device solves for the user, is that the possible combinations of garments relative to dynamic schedules and constraints are tedious to search by hand. The system, methods, and device allow the user to explore these search spaces far more efficiently than ever before.

The user may establish a calendar 116 within the software application for the purpose of scheduling sets of clothing and accessories for current or future events. These events are entered by the user or can be automatically populated in accordance with events like national holidays, weekends vs. weekdays, and so forth. Or for instance an event could consist of a series of days linked together such as a business trip. Using the system, methods, and device, it is possible to structure clothing and accessory sets in advance for specific event types or locations.

Within the user preferences 108, the user may choose to share their entire calendar of events and associated clothing and/or accessory sets with other users or the user may set these requirements for each event as they are entered into the calendar. The calendar can also be associated with one of many types of electronic calendars often associated with hand-held phones such as Microsoft Outlook or Google Calendar to populate the calendar internal to the system, methods, and device invention here.

Information from the preferences and constraints 108, measurements 110, virtual closet 112, clothing tags 114, calendar of events 116, forecasted weather at the event location 118, event setting and lighting 120 are provided to a recommendation system 122 that associates sets of clothes and/or accessories with specific future events and provides recommendations for sets of clothes 124 back to the user. The recommendation system can be in the form of opinion from a fashion expert 126 or via a social network of users 128 or via rule-based and/or case-based expert system 130 and/or an intelligent machine learning algorithm 132 that learns over the stored history of calendar information and clothes worn by each day what the user may feel is suitable for a specific event. In the preferred embodiment the system not only uses the history of one user's fashion choices but the history of all similar users using the system, methods, and device to recommend color and/or fashion choices. The learning is also associated with feedback from the user as to which recommendations are preferred or not, or which sets worked well or not for each event on the calendar. In the preferred embodiment the recommendation system is also associated with clothing retailers and their offerings such that the user can be provided with a recommendation from the retailer or one that includes garments or accessories from a retailer with an option to buy directly from that retailer online, perhaps in advance of an event.

In the preferred embodiment, the suggested sets of clothing are available to the user using visual and/or audial and/or tactile queues 134 such that the clothes represented in the system can be understood by any user, even those visually impaired by color blindness or complete blindness. These queues could be specific to the garment, as in "red shirt," or specific to the quality of a set of clothes and accessories for a specific event, as in "this set looks great," or with a vibration of the phone representing "success." Once selected by the user as a set of clothes to wear to a specific event, that choice is automatically exported to the calendar 116 function associated with a specific date for that event. As the calendar function maintains knowledge of all future event needs and which clothes are or are not available in the user closet 112, recommendations can be provided back to the user to schedule cleaning services or offer alerts to the user 136 to ensure that the clothes for a specific set will be available in time for a specific event. Further, in the preferred embodiment the reservation of specific clothes for specific events may remove their availability for other functions at that same time. Some user events may require extended days, such as a vacation or business trip. In these cases the user can use the application to choose sets of clothes for specific meetings or purposes over that entire trip, in light of the size and weight constraints of luggage or other concerns. The device can be used to make sure that garment sets are complete prior to an event as a checklist. For recurring events, such as a weekly sporting event where the user is a player on the team, alerts may be provided to ensure that all required accessories are available and that the set is complete prior to leaving the house for the game.

Suggested sets of clothing may also be recommended in light of the specific background of interest. For example, for a formal function the user may wish to wear a set of clothing and accessories that is best in light of the background scenery at that function. The set of clothes for the function could be determined in the absence of the background information or, in the case where a photo of the background can be provided in advance, the set of clothes and accessories could be recommended that suits the specific background.

The user may also choose to select a specific first article of clothing from the virtual closet and have the system, methods, and device recommend other clothes to complete a clothes set. The user can then use the system, methods, and device to locate said other articles of clothing from their real-world closet using the camera function on the device to identify clothing with similar characteristics as those recommended by the system, methods, and device. The identification could be on the basis of matching color, shape, size, pattern, or other visual cues. This ability helps users that are visually impaired in the identification of garments that complete sets from their real closet.

In light of clothing set choices, in the preferred embodiment the user and/or the system itself then has the ability to score each set to determine to determine their suitability. Clothing sets are then ranked in order of decreasing suitability, with a user defined set of clothing sets selected to be removed. Articles of clothing in the remaining clothing sets are used to generate new clothing set choices for the user in light of the many possible combinations and constraints defined previously. The user may iterate through this process of selection and variation as a form of iterative interactive evolution. This process is repeated until a garment set of sufficient worth to the user is identified, and that set is added to the calendar for a specific function.

In the preferred embodiment the software allows for multiple users to share the information about their virtual closets and calendars of availability such that the virtual closets of all users are shared. This increases the likelihood that each user will be able to find new combinations of clothes and/or accessories that are right for his/her future events. Users can choose to share his/her clothes and/or accessories with or without a cost to other users. Additionally, the ability for multiple users to share their clothing choices offers the opportunity for users to make sure that they do or do not wear the same clothing sets to the same event as desired. The invention also allows for the opportunity for users to review and exchange clothing between their real closets using the information from the virtual closets.

Through the knowledge of which clothes in the user closet are used most often, it is possible to determine favorite garments and/or accessories and also garments and/or accessories that are hardly ever used and therefore provide an opportunity for removal from the closet either as a donation, or for sale, or for rent or loan to other users through the system. Through the system, methods, and device it is also possible for two or more users to share their profiles and virtual closets and evaluate sets of clothes and/or accessories to determine which sets look best on which users.

All data over all users in the system are stored, including the choices of garments and accessories for events, the locations of those events in terms of their geography and customs, timing, and so forth. These data are in turn used to help users make improved clothing set choices with increased efficacy and efficiency, and can also be used to help retailers understand patterns in color and/or fashion behavior over a large set of users over time. This helps retailers determine which types of apparel to offer by time, season, activity, location, and price. It is also envisioned in the preferred embodiment that retailers would pay to advertise their goods through the system, methods, and device to users who are most inclined to be interested in buying their garments and/or accessories to complete clothing sets. In another instance of the preferred embodiment, cleaning services pay access to use the system and device to determine which users are located near their service center, and which clothes they are likely to need cleaned at what times. This improves the opportunity for cleaning services to schedule and distribute their load and provide incentives to users to use their services.

In a preferred embodiment, the user opens the system, methods, and device using a software application (app) on a hand-held mobile phone 200. The user enters his/her account in the app 202, which then provides the opportunity for the user to (1) access saved outfits, which are collections of clothing articles that the user has saved on prior occasions 204, (2) view individual saved clothing items, 206 (3) enter new clothing items into a virtual closet in the app using either photos taken by the user or other graphics, 208 (4) identify other users to share clothes with or otherwise communicate with, 210 (5) assemble new outfits and receive recommended ratings of the outfits as they are being assembled 212. Other features may also be incorporated.

In a preferred embodiment when the user wants to assemble a new outfit, if the user is a man, he starts by selecting a shirt. The user selects the type of shirt, such as dress shirt, polo/casual collared shirt, or t-shirt. Based on the type of selection, the remaining types of clothes that can be selected is constrained by the system to be appropriate to the type of clothes selected already. For example, if the user selects a dress shirt, then the user cannot add a polo shirt or t-shirt to the outfit because the user already has a shirt. In addition, if the user selects a dress shirt, then the user is offered the possibility to select dress pants but not short pants.

At each point in assembling an outfit, which in a preferred embodiment consists of at least a selected shirt and selected pants, the system provides ratings for how well the articles of clothes go together 214. These ratings can be provided based on (1) expert opinion, (2) the opinions of other users (3) a rule-based or case-based expert system, and/or (4) machine learning. In the case of providing an expert opinion, the opinion of an expert on how well the clothes go together may be preloaded in the app or may be generated in real-time based on an immediate expert response from someone knowledgeable about color matching and/or fashion choices. The same is true when considering the opinions of other users, which may be given in real-time or at a later time.

In the case of a rule-based or case-based expert system, in a preferred embodiment, the app uses a set of decision trees to determine the rating for each next article of clothing based on the articles already selected. Ratings are provided on a scale, such as a star scale, with 1 star being low and 5 stars being high or vice versa. The ratings are determined based on how well the colors and/or styles of the clothes complement each other, as well potentially by the date, time, and place that they are expected to be worn based on the user's entry in a calendar. The decision trees in the app can be updated over time by a system administrator 216 who retains authority to modify the app for any or all users.

In the case of machine learning, in a preferred embodiment the app uses machine learning techniques, which may include a combination of neural networks or deep learning (neural networks with more than one hidden layer), evolutionary algorithms, reinforcement learning, support vector machines, random forest methods, swarm optimization, fuzzy logic, and other techniques. The machine learning methods 300 use data on what the user has liked previously 302, based on what the user has saved as preferred outfits 304, in order to generalize on what the user will like in the future 306. Features about the clothing articles serve to assist in the generalization 308. These features may include color, texture, type of article, time since last worn, patterns in the clothing, and other items. The machine learning methods may also generalize from data from people who are not the current user 310, by associating similar people with similar fashion sense to the user and imputing that what those people like will be similar to what the current user likes. The machine learning methods may use a numeric rating 312 or also word-based descriptions of how well articles of clothing go together rather than numeric ratings 314. For example, when using fuzzy logic, the app may offer that a particular pair of pants goes with a shirt "pretty well" or "poorly." The machine learning algorithms may also adjust the ratings of clothes that are believed to go well together based on feedback from the user and/or other users 316, taking into account fashion/color trends as well as geographic and social dynamics.

In a preferred embodiment, the machine learning methods may also be used to make suggestions to a user as to what to include in their virtual closet based on data provided by retailers and/or other users of the app 318. The machine learning methods accept data on current sales trends of different articles of clothing to users 320 that are generalized to be similar to the current user and constructs a mathematical model 322 that results in suggesting which new articles of clothes the current user should acquire. This could be for the purpose of completing an existing outfit, such as having the app suggest that a particular tie would aptly complement a particular shirt, pants, belt, socks, and shoes already saved by the user as an outfit. It could also be for the purpose of suggesting new outfits or individual articles of clothing to the user not based on what the user already has in his/her virtual closet.

In a preferred embodiment, the app allows for users to contact other users to communicate 400 and identify items of clothing that could be shared, borrowed, or sold from one user to another 402. The app provides for a user to view another user's virtual closet 404, with permission, and to identify articles of clothing that would be desired. The app also allows for a user to identify which articles of clothing would be available for other users 406.

In a preferred embodiment, the app also provides for collecting data regarding the use of different articles of clothing 500, the purchasing habits of users 502, and associated demographic information 504, which can be provided to clothing retailers and manufacturers 506 so as to improve their business performance. Machine learning methods can also be used on these data to provide business insights to retailers and manufacturers.

In a preferred embodiment, the user takes photos and/or video of clothing items 600 from his/her closet and uses these photos to build a virtual closet 602. To do this, the app relies on wireframes and/or images of articles of clothing that the user can identify 604. The photo is then mapped to the wireframe, providing an easy method of presenting a particular item to the user for future use. As the light that is available for taking a photo of a clothing article is not anticipated to be the same for all users at all times, after the user takes a photo of an article of clothing, the photo is presented to the user to confirm that it appears suitable 606. In addition, the user can touch a spot on the photo that best represents the color of the article of clothing. This color is retained by the app in terms of its red-green-blue (RGB) values. These values can then be adjusted based on available information about lighting that was used to take the photo.

In a preferred embodiment one of several processes are used to increase the rate that articles of clothing can be imported into a virtual closet. In a standard approach as described in the parent patent, a user takes individual photos of each individual article of clothing in the wardrobe and then imports these into a virtual closet. In another approach, a user arranges articles of clothing from a wardrobe as an outfit and takes one photo of a complete outfit for purpose of input to the virtual closet and/or scoring. In another approach, a user takes one photo of an entire wardrobe and uses a process of machine learning to automatically identify and label the types of clothing in the wardrobe. This process can be thought of as the instantaneous capturing of all possible outfits through one photo. In a final approach, a user can take video of the articles of clothing in their wardrobe as a "bulk import" and then divide the video content into useful frames of interest focused on articles of clothing as a separate second step.

In the above method focused on the capture of an entire wardrobe through one photo, there are of course many issues to contend with such as the appropriate identification of articles of clothing while viewing the article of clothing largely from the side as it hangs on a hangar. Further, in any user's wardrobe it is not always the case that clothing are grouped nicely by type. Typically, when someone takes a photo of an article of clothing to store in a virtual closet within a smartphone app, the article of clothing is either worn or is placed on another surface, such as a bed. To address the case where multiple items are photographed at once, here we first consider the situation of taking a photo of a person wearing clothes, such as a photo taken in a mirror, or having the items placed on a bed. This leads to a problem of classifying objects relative to the background of the color of that bed.

Various approaches exist in the literature for the clustering of parts of an image based on contrast relative to a background (Chen et al., 2019; Jaiswal et al., 2019; Watkins and van Niekerk, 2019). Additionally there are proven edge-detection functions in the literature often incorporating extended Sobel methods, Canny, Prewitt, Roberts and other methods (including fuzzy logic) (see Vincent and Folorunso, 2009). Here we modify these for the automatic detection of articles of clothing from one image such that a virtual closet can be populated rapidly, along with information about the type of clothing being added to the virtual closet.

Convolutional neural networks (CNNs) are well suited to such problems. As extensions of multilayer perceptrons (fully-connected neural networks), CNNs were inspired by the organization of the visual cortex. Input neurons respond to stimuli in segmented regions of the visual field. This can be replicated in software where different areas of an image are processed by small parts of a larger neural network, which provides subsequent processing to arrive at a characterization of the image (or the data presented if not from an image).

Given a corpus of training examples (e.g., different combinations of articles of clothing in different wardrobes) it is possible to train and test CNNs to detect the location of articles of clothing in images. Given a corpus of training examples (e.g., different articles of clothing assigned by their type in wardrobe settings) it is possible to train and test CNNs to classify clothing by type. For instance Bhatnagar et al. (2017) studied the use of CNNs on the Fashion-MNIST database of fashion items (see Xiao et al.) classified into 10 categories. Classification accuracy reached approximately 92% in test sets; however, the images in the database are much easier than in real-world conditions. While Fashion-MNIST was an important contribution to the general problem of classifying fashion images, the dataset is entirely greyscale with each article of clothing laid out perfectly, not arranged as found typically in a closet. Liu et al. (2016) assembled a color database of articles of clothing on individuals with 120,000 images and studied the use of a cascade of CNNs to identify positions of functional key points defined on the fashion items, such as the corners of neckline, hemline, and cuff. The objective was to recall stored images from limited information. This line of research was an important contribution in a new direction, even though the result showed that images could be retrieved at best about 60% of the time using key locations on specific garments.

A preferred embodiment for this approach makes use of machine learning approaches such as CNNs or evolved neural networks to automatically detect articles of clothing in a single wardrobe photo and automatically assign each article of clothing to a type and/or color for purpose of rapid addition to a virtual closet.

In a separate method for bulk import through video capture, there are other issues to contend with that are different from simple photography. For instance, the camera or smartphone must be pointed at a wardrobe while the user exposes each article of clothing hanging in the wardrobe in an orientation and lighting appropriate to the camera such that a majority of each article of clothing is in clear view during the video. Following this data capture of part of or an entire wardrobe by a user, the completed video is further annotated by one or more additional methods as described below.

Method 1 annotates the video using human intelligence (e.g., a process such as Mechanical Turk) whereby each clothing item is timestamped. The time stamp information of the video is used to train systems to identify a frame for each clothing item. Method 2 annotates the video using machine intelligence to recognize when a clothing item is displayed relative to the motion of items or other elements in the video. For instance, as the user will be moving from one item to the next in the wardrobe, a machine learning approach recognizes that time stamp in the video with less motion likely represent articles of clothing to be categorized. Either of these approaches results in a model that is trained to recognize the timing of articles of clothing in a video stream. Once such a model has been developed a user-collected video can be run through the model where the output of the model provides the time and still frame for each article of clothing in the video.

This rapid categorizing of articles of clothing and their associated still frames abstracted via video capture generates an output that is suitable as input to other downstream models for background segmentation, identification of articles of clothing by type (e.g., pants vs. shirts), identification of clothing categories (e.g., formal, work, leisure), identification of clothing features (e.g., pocket vs. no pocket), identification of patterns of interest (e.g., plaid, striped), identification of texture (e.g., smooth, rough). The importance of the above video capture approach is in the time savings generated through the bulk import of articles of clothes from a user wardrobe.

As similar to our preferred embodiment for individual photo analysis, CNNs are used to determine the type and categorization of the garment in each frame. The success of CNNs across a wide range of other examples of video-event detection/classification provides a foundation for applying similar technology to the problem of detecting and classifying clothing from a video. The technical approach for video processing relies on determining when the image is paused, finding the edges of the article of clothing through a process of edge detection, and then proceeding analogously to classifying a clothing item as if it were taken as a still photo. Therefore, the identification and assignment of garment type or set of garments uses at least one computational approach including, but not limited to, background segmentation, generation of still frames, video-event detection or edge detection using machine learning in order to assist the individual with the task of selecting a preferred matching set of garments.

In a preferred embodiment, the user takes photos of clothing items 600 from his/her closet and uses these photos to build a virtual closet 602. To do this, the app relies on wireframes of articles of clothing that the user can identify 604. The photo is then mapped to the wireframe, providing an easy method of presenting a particular item to the user for future use. As the light that is available for taking a photo of a clothing article is not anticipated to be the same for all users at all times, after the user takes a photo of an article of clothing, the photo is presented to the user to confirm that it appears suitable 606. In addition, the user can touch a spot on the photo that best represents the color of the article of clothing. This color is retained by the app in terms of its red-green-blue (RGB) values. These values can then be adjusted based on available information about lighting that was used to take the photo.

In a preferred embodiment, one method for making this adjustment relies on using a light meter to determine the luminosity in the area 608. Based on the luminosity as compared to a standard reference luminosity, the RGB values area adjusted up or down as appropriate to approximate what the RGB values would be had the photo been taken under a standard reference luminosity.

In a preferred embodiment, another method for making this adjustment relies on having the user take a photo under their current light of a reference material of a known color, such as a white piece of paper 610. The resulting RGB values are then compared to the known RGB values of the reference material, such as 255-255-255 for white. The app then makes adjustments to increase or decrease the RGB values as appropriate based on how much discrepancy there was between the identified RGB values and known reference values.

It is recognized that the human eye can differentiate over 10 million colors; however, it would be impractical for a system, methods, and device in this application area to identify articles of clothing based on 10 million colors. People are used to identifying colors based on a very small subset of all possible colors, and retailers often use a standard subset of clothes that are known by their color such as "khaki" pants. In a preferred embodiment, a method is used to map various colors 700 to more commonly known colors 702 that are representative of the color being viewed. A set of colors, such as red, orange, yellow, light green, dark green, light brown, dark brown, khaki, charcoal, light grey, black, white, ivory, light blue, navy blue, royal blue, light pink, dark pink, purple, lavender, and gold, that provides an intuitive spectrum of possible colors may be used. Colors are mapped to the colors in the selected set based on a distance measure, such as Euclidean distance in RGB space, and the closest color in the selected set is chosen as the representative color label to identify the color of the article of clothing to the user.

In a preferred embodiment, the user may also decide to add labels for colors that are of interest 704. For example, if the provided set of labeled colors includes orange, but no other variations of orange, and the user has a variety of orange-colored shirts, he may wish to add labels for colors such as tangerine, rust, or pumpkin. This may be done by inputting the RGB values associated with the color label, which are generally available from many sources.

In a preferred embodiment, users 800 share their virtual closets 802 with garment cleaning companies 804 when dropping off their garments for cleaning. Given garment cleaners often already tag individual garments with barcodes and hand enter data about each garment through a point-of-sale software system, as garments are entered into the garment cleaner system, the data can be used to automatically populate the user's virtual closet with garments 806 as a service.

Given it is the case that not all humans visualize colors in the same way, this data entry can include errors based on the variance of human perception and the subjectivity of color assignment. The methods of the present invention avoid these pitfalls by standardizing the color labeling on the basis of objective, repeatable elements such as RGB values or the assignment of RGB values to color names. The preferred method also enhances the ability of garment cleaning companies to hire employees with disabilities through improved automation. Through our method the data entry may also be accomplished through bulk import 808 of a single user's garments to speed up the process to help, for example, a dry cleaner keep track of these garments while in their care. In this respect, the third-party entity's virtual closet 810 contains garments from a variety of users and where these garments come and go from the third-party entity's virtual closet with time. Once garments are in the system, the garment cleaner can use the method for garment tracking 812 through the cleaning process from start to finish while sending outbound user notifications 814 regarding the status of the process and when each garment or collection of garments is ready for pickup. From the user's perspective, garments that are at the garment cleaners still appear in the individual user's virtual closet but with a label that indicates their status in the garment cleaning process.

Users can choose to make their personal calendars 816 available to the garment cleaner. In this embodiment, for example, a dry cleaner learns when to expect to receive user garments after a trip or when to provide cleaned garments back to the customer in time for a subsequent trip. The method also allows garment cleaners to appropriate time discounts or other marketing offers to customers relative to their calendar or known history of travel or previous history of garment cleaning. The method can also allow garment cleaners to improve their understanding of possible service offerings including on-demand pickup of garments or drop-off facilities that improve access to garment cleaning services.

As a part of the present invention, dry cleaners can monitor the deterioration of garments 818 and number of wash cycles on a per-garment basis, adding this information back to the closet for each individual user. This information will help the users forecast when it is time to either repair or replace a garment of specific type and understand how often specific garments are used and cleaned. Garments that are aging and yet routine use by a user are strong candidates for replacement, and links can be provided directly to a user that connects the user with a retailer with similar item for sale thus helping to reduce the time required for users to find replacement garments and helping direct customers to retailers.

A preferred embodiment utilizes garment cleaners and their information across multiple user virtual closets 820 as a hub for the renting or sharing or sale of garments 822 between customers. For instance, if user A has a jacket that is now ready for pickup, user is A alerted by a dry cleaner. User A can choose to also make the jacket available for rent. In this case, the dry cleaner can make the jacket available in the virtual closets of other users of the system. If User B wishes to rent User A's jacket, this can be accomplished through the dry cleaner, with User B picking up the jacket for use with payment either directly to User A or payment to the dry cleaner on behalf of User A. When rented, that garment appears as "rented" in User A's virtual closet until such time as User B has completed their use. When User B has completed use, User B returns the rented garment to the same dry cleaner for cleaning after which User A is alerted again that the garment is available for pickup or rent. This process is repeated until User A collects the garment physically from the dry cleaner or until the dry cleaner requests that User A does so or pays a fee for storage with the dry cleaner. Throughout the process of rental, the virtual closets of both User A and User B are updated with regards to the status of the jacket 824. This process can be repeated for any garment or accessory suitable for dry cleaning irrespective of the age or gender of either user. Note that the standardization of colors across all garments and across all user virtual closets means that when User B expects to receive a jacket of a specific color from User A, the jacket will indeed be that color and not some variation based on the subjective color assignment of either User A or User B, one or both of whom might have issues with color perception such as those with color blindness. Use of our method eliminates this subjectivity and ensures that all colors across all virtual closets are represented in a standardized way.

The method allows for the information regarding the entire set of garments being processed through a garment cleaning store over time to be examined for trends regarding the garment age, producer, size, color, pattern, or other characteristics. For example, such trend analysis 826 is useful for dry cleaning stores to better understand the nature of their customers, for load and schedule balancing, and for possible discounts back to specific users and specific times to improve revenue. Such information is also licensed back to retailers to provide new insights across broad geographic regions and across garment retailers helping drive new product decisions and providing direct access to users through their virtual closets. Users can opt in to have retailers connect with them directly regarding product offerings or reduced pricing on garments in light of the user's garments, virtual closet, and cleaning trends.

Given point of sale systems are key in the garment cleaning industry, the method can be connected directly to point of sale systems to further improve quality of customer experience and business efficiency or the method can be on an individual basis on each user's smart phone.

In a preferred embodiment, the user maintains a presence in both a real, physical environment 900 as well as in virtual environments 902. This duality between both real and virtual environments is becoming increasingly important as more people spend time interacting in digital computing worlds. A user in a physical environment makes use of a software application 904 to assist with colors and choices of garments to wear via a fashion recommendation system. As previously described such a system converts the garments in a physical closet 906 into digital representations of those garments in a virtual closet 908. The digital renditions 910 of these garments have their own utility in a wide range of contexts. For instance, using color matching 912 approaches and the knowledge of many garments, their colors, associated attributes, and use, a design engine 914 can be used to create different types of digital garment representations. For example, these can take the form of non-fungible tokens 916 representing unique and novel garment colors and/or attributes, or wholly new types of digital garments and their color associations 918, or even digital versions of popular garments worn by people in reality 920. Each of these can be used in their own way to add value to a database of digital garment designs 922 that can be provided to customers such as designers and retailers 924, or other end users for income either on their own as digital representations such as in the case of non-fungible tokens or with the specific intent of converting the digital renditions back into garments that can be worn in reality 926. Further the garments representing the output from the design engine 914, such as non-fungible token designs 916, novel digital garments 918, or digital versions of popular garments 920, can be provided to a digital environment such as a digital gaming environment 928 such that the garments can be applied to virtual characters 930 in said digital environments. The digital renditions 910 of garments in the user's virtual closet can also be applied to virtual characters in these gaming or other digital worlds, if the user, for instance, would choose to dress like they would in reality. The garments, their colors, and attributes, can be evaluated in digital contexts 932 to determine which are considered more or less desirable. Garments can be assigned value as desired 934 or undesired 936 in specific contexts. These garments and their assigned values can be added to the database of digital garment designs 922 and used as a part of the decision making for designers and retailers 924 in their decision of whether or not to generate physically wearable garments from the set of desired digital garments in light of similar contexts between the virtual and real worlds. The set of garments derived from digital environments and converted back into physically wearable garments for sale or license to consumers and once attained, these can be added to the user's physical closet 906.

This method has specific advantages. Artists can use the method to generate new garments with novel color combinations and try these in digital environments for more rapid feedback. Users can express greater personality by comparing the utility of the digital representations of their real-world garments versus digital representations of garments they have never worn or would be unable to afford in real contexts. The design engine itself represents a new opportunity for the fashion community to generate new garments and outfits and could accentuate or even replace human designers. And those users who have vision impairments such as are color blindness or complete blindness can know that their digital representations are appropriate facsimiles of the colors and garments they would wear in real-world contexts.

In a preferred embodiment the design engine 1000 makes use of machine learning techniques, which may include a combination of neural networks or deep learning (neural networks with more than one hidden layer), evolutionary algorithms, reinforcement learning, support vector machines, random forest methods, swarm optimization, fuzzy logic, and other techniques. As with the color matching approaches described previously for the generation of outfits within the software application, machine learning methods use data regarding the digital representations of garments, their desirability in digital contexts in order to generalize what will work well in future digital environments 1002. This approach can be used to generate novel digital garment representations that are well-suited to digital environments where the digital garment could if desired be generated into a novel real garment for use in real-world environments that are similar to the digital environment. For instance, a colorful garment could be designed for a winter setting in a digital gaming environment and if that was determined to be of utility in that context, the same digital garment representation could be provided to a garment maker and generated in the real-world for use in winter settings. The method makes use of the digital environment for the generation and assay of a wide variety of garment types, colors, and accessories in order to discover which of those garment types, colors, and accessories have particular utility in digital environments such that knowledge of their utility can be identified at low cost and in a way that could be used to generate real physical instantiations of the digital garment representations if desired. Given the input to the design engine includes the garments and their attributes this includes their color. A preferred use of the above design engine is the design and evaluation of garments in digital settings for color deficient persons such that the garments they use in digital environments can help overcome their deficiencies and such that if a useful set of colors, patterns or colors and patterns is identified as being useful to color deficient persons in those digital settings, the same colors and patterns could be used on garments in real-world settings to improve their quality of life. As noted previously in this patent, the color in the software application is retained in terms of its RGB values as these are adjusted based on available lighting and provided a color name. The design engine can make use of this RGB-based color palette 1006 or other color palettes such as the Pantone color palette 1008 or combinations of these palettes for the colors and assignments used by the design engine to generate novel digital representations.

In a preferred embodiment, users 1100 upload not only their garment photos 1102 to the virtual closet 1104 but also any makeup 1106 that they use as well as a photo of the user's face 1108. All of these inputs to the virtual closet are then associated with RGB values and provided a color name. In terms of makeup, these can be associated with a color palette 1110 such as an RGB-based color palette or the Pantone color palette or combinations of these palettes or palettes specific to the type of makeup being used such as more granularly defined shades of red when working with lipstick. Similarly, the color of the user's face is identified in terms of RGB values and associated with a color name with a color palette specific to the distribution of human skin tones 1112. Other facial colors 1114 are captured including eye color, hair color, eyebrow color, etc. each relative to the RGB-based color palette or other color palette specific to the distribution of human skin tones. All of this information can be stored in the user's virtual closet 1104 within a computing device 1116. As described previously, a central focus of this invention is the color matching of garments of different types. However, that matching can be accentuated or even driven by color matching to makeup, natural skin tones, or other colors associated with a user's face. The objective of this preferred embodiment is to match garments not only with respect to their colors but to the colors associated with the user's face or to match the colors associated with a user's face with the colors of their chosen garments. Within the computing device, while it is possible for a user to use their finger to identify the colors of specific locations on each image, a preferred embodiment for the facial color components uses method of machine learning to automatically recognize the locations of facial features 1118 such as eyes, eyebrows, and hair and then automatically generate their associated RGB values. In a preferred embodiment the generation of outfits 1120 focuses not only on garments and their associated colors but also makeup and their associated colors as well as facial colors including skin tone. Further, in the generation of outfits, the user can take into consideration other fashion elements 1122 such as the current season, a venue or location, or fashion trends. In a preferred embodiment this combination of garment colors and facial colors is key in the generation and scoring 1124 of outfits for their quality. Outfits can be scored in several regards. As noted previously it is possible to score combinations of garments with regards to their color matching. It is also possible to score combinations of makeup with regards to their color matching. Further it is also possible to score combinations of both garments and makeup with regards to color matching and also do so relative to the user's skin tone. Such matching improves the overall look of a person who is interested in matching colors in the best way possible.

As the user generates outfits that include both garments, makeup, and skin tone, a database of outfit information 1126 can be generated that includes information about the garments, makeup, facial features, skin tone and associated seasons, venues, or fashion trends. In the event that the user is generating outfits in a virtual context such as a simulated dating game, a similar database of digital outfit information 1128 can be generated that includes information about the garments, makeup, facial features, skin tone, and associated seasons, venues, or fashion trends in those virtual environments. Given sufficient outfits and their scores in either real or virtual environments or both, it is possible to use machine learning to assist the user in the tailoring of suggested new garments and/or makeup choices 1130 that would improve their score or otherwise match their personal color style over time. Over the set of users, machine learning is used to improve the understanding of fashion trends 1132 in the matching of garments to makeup relative to skin tones in either or both of these settings.

As noted previously, in a preferred embodiment the user maintains a presence in both a real, physical environment as well as in virtual environments. It is the case that the system and methods above for the matching of colors across garments, makeup, and skin tone also can apply to virtual environments. For example, in a virtual context a player may wish to make sure that their character matches in terms of the color of their garments as well as the makeup on their face before interacting in a simulated dating environment. The virtual contexts provide additional opportunity for scoring of garment, makeup, and skin tone combinations relative to the performance in those virtual environments. Further, combinations of garments, makeup, and skin tone that are of high quality in virtual environments can be either shared with other users of the computer application or used to improve the suggested combinations within said computer application. Further, these combinations, considered as the equivalent of a "look" in the fashion world, can be saved and sold as their own virtual art. It can be as well that new makeup colors could be derived in a personal basis for users of specific skin tones and garment colors in their virtual closet.

In a preferred embodiment, users 1200 existing in real-world 1202 environments can choose to also exist in virtual world 1204 environments. For example, an individual in a real-world environment may operate in a digital game or simulated world or combination of simulated worlds in a metaverse. In the real-world environment, the individual interacts with a real closet 1204 making decisions about the appropriate real garments 1206 and accessories from said closet in order to interact with a desired real environment 1208. For example, as noted previously in this patent the individual may wish to wear a tuxedo to a black-tie function or wear an appropriately colored bathing suit to a beach. The appropriateness of the colors of the garments, accessories, make up, and skin tone can be scored 1210 with respect to their matching through approaches already described, including their suitability to the colors associated with the real environment as the background.

In a virtual world 1212, each individual interacts with a virtual closet 1214 that may be connected directly to that individual's real closet. Further, as described previously, virtual closets may be connected between individuals, offering the opportunity for a large collective virtual closet. Management of both the real closet and virtual closet can be left up to the individual, or directed via computer suggestions 1216 that create a series of suggested combinations of garments, accessories, makeup, and skin tones and their colors that are based on data or information stored by previous history of use, or relative to the intended venue or situation that the individual will be in, or any form of self-expression to complete a virtual character operating in a virtual environment with images selected from the virtual closet and placed anywhere on the virtual character operating within the virtual environment. Moreover, the virtual closet is used to create such suggested combinations in order to assemble colors of a virtual character operating relative to the colors of a virtual background in a virtual environment based on the virtual closet. For example, the virtual representation of a shirt with a favorite logo could be used where a shirt would normally be worn in the real world or over the entire body of a virtual character. In this manner users interacting with virtual closets not only have a large collection of digital representations of garments, accessories, makeup, and skin tones to choose from, but for each of these classes the set of all possible colors and all possible color combinations is possible. Further in a digital context it is even possible to change the nature of what constitutes a shirt or blouse, or where makeup can be applied on a virtual character, or even the mixing of skin tones on different parts of a character representation. Virtual skins themselves could be made of colors, patterns, or images and include makeup and skin tone. We define this collective set of possible garments, accessories, makeup, and skin tones to be "skins." Virtual skins can also be overlayed in digital environments to change the resulting color, such as an averaging of the RGB values of two garments worn simultaneously on the same location of the virtual character or any other means of combining their individual virtual skin colors to generate new colors. Therefore, in a virtual context, individuals can choose from a very diverse array of virtual skins 1218 each with their associated size, shape, color, transparency, and opacity. These choices are made in light of the virtual backgrounds 1220 and their color, transparency and opacity. Taken together, the interaction of a virtual character with a virtual background is considered as a virtual environment.

Given the number of possible combinations of virtual skins and virtual backgrounds, it becomes very difficult for the individual to know precisely how to match skins and backgrounds to maximize performance in a variety of ways. For instance, the individual may wish to simply look their best at a virtual wedding. Or the individual may wish to maximize their camouflage in virtual combat. For the color-blind individual interacting in this virtual world, the challenge of determining which colors are optimal in light of a desired purpose becomes even more daunting. Further, as opposed to real-world settings where background colors remain rather constant such as the color of the ocean or the color of a desert landscape, in a virtual context, backgrounds may change dynamically as an entire background or as specific portions of a background. Moreover, the virtual skins can be overlayed to change the resulting color apparent to the individual. Further, it may be that the sounds or other non-visual cues associated with a virtual environment could enhance the perception of the color of that virtual environment such as the crackle of a fire associated with the bright orange background of a virtual forest fire. Even the introduction of another character into a background can be considered as changing a part of the color of that virtual environment. And given that characters in virtual environments might share information about virtual closets their skins can change at any time. In such situations it becomes even more complex to understand how to properly change the color of skins relative to the colors of a dynamic background or as a creator of a virtual world how to change the background dynamically in light of individuals changing their skins dynamically. To assist with this issue, a software application 1222 making use of statistical methods and/or machine learning to evaluate combinations of the virtual skins and the virtual backgrounds based on their associated colors and maximize performance given a specific purpose or purposes. Such a system and method is used for the scoring 1224 of each virtual skin and virtual environment combination either before a game is played or in real-time during game play so as to maintain a level of appropriateness in the quality of color matching relative to a desired purpose. For example, if the purpose is to maximize the ability of real-world color-blind persons playing the digital game, the colors of the virtual skins will be adjusted automatically relative to the colors of backgrounds of the virtual environment to maximize visibility of the character despite the vision deficiency of the real-world individual. In an opposite example, if the intended purpose is to maximally confuse color blind persons playing digital games, the colors of the backgrounds could be dynamically adjusted relative to the virtual skins of the user's character to minimize the visibility of the character given the vision deficiency of the real-world individual. Strategies that combine the color dynamics of the virtual environment as well as the virtual skins can be considered as co-evolutionary systems that have their own interesting real-time dynamics. In this regard the same software application being used to score the suitability of virtual skin colors and virtual environment colors in virtual worlds can be used to adjust the virtual skin colors 1226 of the virtual environment or adjust the colors of virtual background 1228 or both in real-time. The adjustments (through iterative variation, scoring and selection) are then fed back into the virtual world as new virtual skins or virtual environments and scored once again, resulting in new virtual skins, new virtual backgrounds and new virtual environments. This also results in the virtual skins being scored related to the virtual backgrounds and/or the virtual backgrounds being scored related to the virtual skins. Furthermore, the color of the virtual skins and/or the virtual backgrounds can be adjusted, resulting in alternative virtual environments. A process of evolutionary computation can be used to optimize this process in real time as a model of the co-evolutionary system.

At any time, the combination of colors for virtual skins and colors for virtual backgrounds can be saved 1230 and exported as non-fungible tokens (NFTs) 1232 or virtual filters 1234. In this respect, the imagery of the skins is "frozen" in time as paired with specific backgrounds as being iconic or one-of-a-kind expressions which can be treated as art or fashion. The same combinations of virtual skins and virtual backgrounds can be considered as a virtual filter that an individual can apply at any time to assist in the viewing of a virtual world. That same information representing the color contrasts between virtual skins and virtual backgrounds can be used to help generate filters for the improved viewing of content in the real world. The individual skins or backgrounds or combination of skins and backgrounds can also be shared or potentially minted as NFTs. Further, interesting virtual skins can be considered as suggestions for real-world environments 1236 as the real-world environment may share characteristics of the virtual-world environment where the virtual skins scored well and it would be possible to alert the real-world individual to real-world garments that should be in their real-world closet. Databases 1238 containing the history of the dynamics of the colors of virtual skins and backgrounds in virtual environments can be stored and examined for interesting trends 1240 that may assist in new ways in the understanding of fashion. This understanding can be used to help designers in real-world settings design new combinations of garments, accessories, makeup, and skin tones that are most suitable for desired purposes in real-world environments, venues or specific purposes 1242. For example, the lessons learned in virtual contexts about the improved quality of play of color-blind individuals can help improve the overall quality of life for those same persons in real-world environments. Similarly, the same system can be used to inform real-world persons not afflicted with color vision deficiencies what life is like with those deficiencies in virtual environments.

In an alternative embodiment, users 1300 with some type of visual impairment 1302 interact with a computing device 1304 to properly interpret the colors found in one or more maps 1306 such as those that might be associated with transportation systems such as subway maps, weather maps, topographic maps, maps within gaming environments, or maps provided to users in real-time contexts such as those associated with automated routing and directions in real-world environments such as Google maps. Within digital contexts maps can be immersive with specific colors to enhance certain environments. This interpretation can either be through a color filter 1308 that is associated with the type of vision deficiency, for instance color blindness, by properly converting and/or labeling the colors on maps so that users can interpret them correctly. Alternatively, the red, green, and blue (RGB) colors are calculated 1310 through at least one computing device such as a portable communication device such as a smart phone and the colors provided to the user through the computing device either in a corrected form as a revised map 1312 or with labels with ease of correct interpretation. A database of map and user information linking visual impairments, color filters, and revised maps 1314 can then be used to further inform the color conversion process by identifying color palettes that minimize visual impairment 1316 and identify color palettes that maximize visual impairment 1318. This information can be used for the generation of new map designs 1320 to score the suitability of maps before they are provided to users in real-world or virtual contexts. Further, the same database can be used to learn more about human visual impairment and ways to identify those visual impairments automatically through the generation of color filters.

In a preferred embodiment, the user maintains a presence in both a real, physical environment 1400 as well as in a virtual context 1402. A user in a physical environment makes use of a software application 1404 residing on a portable communication device or other computing device to assist with the interpretation of colors in physical maps 1406. The digital renditions 1408 of these maps have their own utility in a wide range of contexts. For instance, using color matching 1410 approaches and the knowledge of many maps, their colors, associated attributes, and use, a design engine 1412 can be used to create different types of digital map representations. For example, these can take the form of non-fungible token map designs 1414 representing unique and novel map colors and/or attributes, or the generation of new digital maps 1416 and their color associations, or even digital versions of popular maps 1418 from the real-world. Each of these can be used in their own way to add value to a database of digital map designs 1420 that can be provided to customers such as map makers 1422, or other end users for income either on their own as digital representations such as in the case of non-fungible tokens or with the specific intent of converting the digital renditions back into maps that can be generated in reality. Further the maps representing the output from the design engine, such as non-fungible token designs, novel digital maps, or digital versions of popular maps, can be provided to a virtual context such as a digital gaming environment 1424 such that the maps can be used to define the colors of that environment or even applied as skins to virtual characters 1426 in said digital environments. In this context, skins can represent maps as fabrics in the metaverse. The maps, their colors, and attributes, can be evaluated 1428 in digital contexts to determine which are considered more or less desirable. Maps can be assigned value as desired 1430 or undesired 1432 in specific contexts. These maps and their assigned values can be added to the database of digital map designs and used as a part of the decision making for map makers in their decision of whether or not to generate physical maps from the set of desired digital maps in light of similar contexts between the virtual and real worlds. The set of maps derived from digital environments and converted back into physical maps for sale or license to consumers. This method has specific advantages. Artists can use the method to generate new maps with novel color combinations and try these in virtual contexts for more rapid feedback. The design engine itself represents a new opportunity for the map making community to generate new maps and can accentuate or even replace human designers.

New maps being informed by this process are generated through a design engine 1500. These maps could be used in virtual contexts or in real-world environments. In a preferred embodiment the design engine makes use of at least one machine learning technique, which may include a combination of neural networks or deep learning (neural networks with more than one hidden layer), evolutionary algorithms, reinforcement learning, support vector machines, random forest methods, swarm optimization, fuzzy logic, and other techniques. As with the color matching approaches described previously for the generation of maps within the software application, machine learning methods use data regarding the digital representations of maps, their desirability in virtual contexts in order to generalize what will work well in future virtual contexts. A preferred use of the above design engine is the design and evaluation of maps in virtual contexts 1502 for color deficient users such that the novel digital map representations 1504 they use in virtual contexts can help overcome their deficiencies and such that if a useful set of colors, patterns or colors and patterns is identified as being useful to color deficient persons in those virtual contexts, the same colors and patterns could be used on maps in real-world environments to improve their quality of life. As noted previously in this patent, the color in the software application is retained in terms of its RGB values as these are adjusted based on available lighting and provided a color name. The design engine can make use of this RGB-based color palette 1506 or other color palettes such as the Pantone color palette 1508 or combinations of these palettes for the colors and assignments used by the design engine to generate novel digital map representations.

It is to be expected that the description of the preferred embodiment is not a limitation on variations or extensions of the invention. For example, it may be desirable to allow a male user to create an outfit starting with an article of clothing other than a shirt. Similarly, in a preferred alternative embodiment, the present invention is used to assist an individual with the task of interpreting at least one map through use of a device to identify and extract color and/or pattern from the at least one map through use of a camera and at least one algorithm.

This invention described here is useful for optimizing color or fashion decisions for people with or without visual impairment. The invention couples human expertise of many different types and the user's collection of garments and accessories to recommend clothing sets that are appropriate in light of work, season, weather, or other environment requirements. Using the system and device the user then uses a process of iterative evolution to arrive at garment sets that are best for future events and in light of many constraints. The systems and devices described herein may also apply the present invention for interpreting at least one map, wherein revisions to such map could be used in real-world or virtual environments.

It will be appreciated that details of the foregoing embodiments, given for purposes of illustration, are not to be construed as limiting the scope of this invention. Although several embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

We claim:

1. A method for assisting an individual with the task of interpreting at least one map, the method comprising: providing a portable communication device to identify and extract color and/or pattern from the at least one map through use of a camera and at least one algorithm; providing a processor capable of accessing locally stored and/or remote information about the at least one map; assigning colors on the at least one map with a red green blue (RGB) value through use of a color assignment algorithm; wherein the individual can touch a spot on digital renditions of the at least one map to determine the RGB value; providing a database for storing the digital renditions of the at least one map; wherein the individual imports the at least one map, through a series of photos or video, for bulk import into the database; providing revisions to the at least one map or designs for at least one novel map, for use in real-world or virtual environments, wherein the at least one map can be scored relative to a background in the virtual environment such that map colors or map backgrounds or both the map colors and the map backgrounds are adjusted resulting in alternate color combinations in virtual contexts.

2. The method of claim 1, wherein the at least one map or designs for the at least one novel map in real-world contexts have two or more dimensions and one or more colors.

3. The method of claim 1, wherein the at least one map or designs for the at least one novel map in virtual environments have two or more dimensions, one or more colors and changes dynamically.

4. The method of claim 1, wherein the at least one map or designs for the at least one novel map in the virtual environments are immersive in three or more dimensions and allow the individual to become a virtual character to exist within the at least one map or designs for the at least one novel map.

5. The method of claim 1, wherein the at least one algorithm is a case-based procedure.

6. The method of claim 1, wherein the at least one map is inputted to the processor using the bulk import via photography or video.

7. The method of claim 1, wherein color combinations within the at least one map are evaluated relative to the at least one map itself and relative to any background color which may exist.

8. The method of claim 1, wherein machine learning techniques are used as the color assignment algorithm to automatically identify colors and their locations associated with the at least one map.

9. The method of claim 8, wherein the machine learning techniques include any combination of neural networks or deep learning, evolutionary algorithms, reinforcement learning, support vector machines, random forest methods, swarm optimization and fuzzy logic.

10. The method of claim 1, wherein a database of map and user information is generated including information about users, backgrounds, color filters, maps and their combination.

11. The method of claim 10, wherein the database of map and user information is used to identify color palettes in relation to the visual impairment of the individual.

12. The method of claim 1, wherein the at least one map is placed on a virtual character in the virtual environment as a skin.

13. The method of claim 1, wherein a software application using statistical methods and/or machine learning evaluates combinations of the map colors and the map backgrounds based on their associated colors and makes adjustments in order to maximize performance in the virtual contexts, wherein the machine learning comprises a combination of neural networks or deep learning, evolutionary algorithms, reinforcement learning, support vector machines, random forest methods, swarm optimization and fuzzy logic.

14. The method of claim 13, wherein iterative variation, scoring, and selection results in new maps and new backgrounds in the virtual contexts.

15. The method of claim 1, wherein combinations of the map colors and the map backgrounds are exported as non-fungible tokens, and/or stored in the database for storing the digital renditions of the at least one map for the understanding of color matching and its relation to map making.

16. The method of claim 1, wherein non-visual senses are used to enhance or change the perception of color in the virtual contexts.

17. The method of claim 1, wherein combinations of the map colors and the map backgrounds are preserved as filters for the individual in the real-world or virtual environments.

18. The method of claim 1, wherein color palettes used in the color assignment algorithm are pre-loaded based on a known visual impairment of the individual.

19. The method of claim 1, wherein color palettes used in the color assignment algorithm are combined with standard color palettes to generate novel colors in the at least one map.

20. The method of claim 1, wherein human visual impairments can be identified automatically through the generation of color filters.

* * * * *